US012683873B2

(12) United States Patent
Chandrasekaran et al.

(10) Patent No.: US 12,683,873 B2
(45) Date of Patent: Jul. 14, 2026

(54) GEO REDUNDANCY AWARE NETWORK SLICE MANAGEMENT FUNCTION (NSMF) IN A WIRELESS NETWORK SYSTEM

(71) Applicant: Samsung Electronics Co., Ltd., Suwon-si (KR)

(72) Inventors: Ganesh Chandrasekaran, Bangalore (IN); Shailendra Rajpoot, Bangalore (IN); Abhinay Kumar, Bangalore (IN); Gudipudi Sri Sai Krishna Phani, Bangalore (IN); Bohyun Song, Suwon-si (KR); Taesung Kwon, Suwon-si (KR); Sungwon Yun, Suwon-si (KR); Yoojin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 18/734,654

(22) Filed: Jun. 5, 2024

(65) Prior Publication Data

US 2024/0340226 A1     Oct. 10, 2024

Related U.S. Application Data

(63) Continuation of application No. PCT/KR2024/003884, filed on Mar. 27, 2024.

(30) Foreign Application Priority Data

Apr. 5, 2023     (IN) .............................. 202341025803
Mar. 19, 2024     (IN) ............................. 2023 41025803

(51) Int. Cl.
*H04L 41/40*          (2022.01)
*H04L 41/5019*          (2022.01)

(52) U.S. Cl.
CPC .......... *H04L 41/40* (2022.05); *H04L 41/5019* (2013.01)

(58) Field of Classification Search
None
See application file for complete search history.

(56) References Cited

U.S. PATENT DOCUMENTS 11,146,453 B2      10/2021  Li
2014/0018064 A1      1/2014  Taglienti et al.
(Continued)

FOREIGN PATENT DOCUMENTS

CN          110476402 A      11/2019
CN          113965938 A      1/2022
(Continued)

OTHER PUBLICATIONS

3rd Generation Partnership Project; Technical Specification Group Services and System Aspects; Telecommunication management; Study on management and orchestration of network slicing for next generation network (Release 15), 3GPP TR 28.801 V15.1.0, Dec. 27, 2017.
(Continued)

*Primary Examiner* — Fadi Haj Said
(74) *Attorney, Agent, or Firm* — Jefferson IP Law, LLP

(57)          ABSTRACT

A method performed by an active-network slice management function (NSMF) of an active-cloud orchestrator node for geo redundancy (GR) awareness, comprises sending, to a GR controller of the active-cloud orchestrator node, a GR information request message to receive GR information. The method comprises receiving, from the GR controller, a GR information response message comprising the GR information including a synchronization status between the active-NSMF and a standby-NSMF of a standby-cloud orchestrator node and a current state of each of the active-NSMF and the (Continued)

standby-NSMF. The method comprises determining at least one action to be performed based on the GR information. The method comprises performing the at least one action for life cycle management (LCM) operation.

20 Claims, 21 Drawing Sheets

(56)                    References Cited

U.S. PATENT DOCUMENTS

| | | | |
|---|---|---|---|
| 2016/0328251 A1 | 11/2016 | Bernstein et al. | |
| 2022/0052907 A1* | 2/2022 | Hua | H04L 41/0668 |
| 2022/0109604 A1* | 4/2022 | Suryanarayanarao | H04L 41/044 |
| 2023/0006889 A1 | 1/2023 | Thyagaturu et al. | |
| 2023/0033886 A1 | 2/2023 | Goswami et al. | |
| 2024/0235957 A1* | 7/2024 | Gritli | H04L 41/342 |

FOREIGN PATENT DOCUMENTS

| | | | | |
|---|---|---|---|---|
| EP | 3 116 163 B1 | 6/2019 | | |
| EP | 2 687 045 B1 | 9/2019 | | |
| WO | WO-2022249072 A1 * | 12/2022 | | H04L 41/342 |
| WO | WO-2023030945 A2 * | 3/2023 | | H04W 24/04 |

OTHER PUBLICATIONS

European Search Report dated Dec. 2, 2025, issued in European Application No. 24785098.5.

3rd Generation Partnership Project; Technical Specification Group Services and System Aspects; System architecture for the 5G System (5GS); Stage 2 (Release 18), 3GPP TS 23.501 V18.5.0 (Mar. 2024).

3rd Generation Partnership Project; Technical Specification Group Services and System Aspects; Management and orchestration; Concepts, use cases and requirements (Release 18), 3GPP TS 28.530 V18.0.0 (Dec. 2023).

3rd Generation Partnership Project; Technical Specification Group Services and System Aspects; Management and orchestration; Provisioning; (Release 18), 3GPP TS 28.531 V18.5.0 (Mar. 2024).

3rd Generation Partnership Project; Technical Specification Group Services and System Aspects; Management and orchestration; Generic management services (Release 18), 3GPP Ts 28.532 V18.2.0 (Mar. 2024).

3rd Generation Partnership Project; Technical Specification Group Services and System Aspects; Management and orchestration; 5G Network Resource Model (NRM); Stage 2 and stage 3 (Release 18), 3GPP TS 28.541 V18.7.0 (Mar. 2024).

3rd Generation Partnership Project; Technical Specification Group Core Network and Terminals; Interface between the Control Plane and the User Plane Nodes; Stage 3 (Release 18), 3GPP TS 29.244 V18.1.0, Mar. 28, 2023.

International Search Report dated Jul. 22, 2024, issued in International Application No. PCT/KR2024/003884.

* cited by examiner

GEO REDUNDANCY AWARE NETWORK SLICE MANAGEMENT FUNCTION (NSMF) IN A WIRELESS NETWORK SYSTEM

CROSS-REFERENCE TO RELATED APPLICATION(S)

This application is a continuation application, claiming priority under § 365(c), of an International application No. PCT/KR2024/003884, filed on Mar. 27, 2024, which is based on and claims the benefit of an Indian Provisional patent application number 202341025803, filed on Apr. 5, 2023, in the Indian Intellectual Property Office, and of an Indian Complete patent application number 202341025803, filed on Mar. 19, 2024, in the Indian Intellectual Property Office, the disclosure of each of which is incorporated by reference herein in its entirety.

FIELD OF INVENTION

The disclosure relates to a wireless network. More particularly, the disclosure relates to a Geo Redundancy (GR) aware Network Slice Management Function (NSMF) in a Cloud-Native ecosystem.

BACKGROUND

In general, a container-based microservice architecture has gained substantial attention among next generation $5^{th}$ generation (5G)/6th generation (6G) telco vendors and operators. Many challenges of traditional monolithic architecture applications are tackled by microservices paradigm. However, to leverage the benefits of the microservices style, one needs to use technologies aligned with the characteristics of microservices for its deployment. The cloud native, container-runtime and container-orchestrator has become a popular deployment format for microservice applications among telco products.

Several commercial 5G Telecommunication network products including network-element management system (EMS), radio access central unit (CU), radio access distributed unit (DU) and 5G core network functions are already being redesigned to fit the microservice paradigm as containers. These also align with the 5G standardization bodies such as $3^{rd}$ Generation Partnership Project (3GPP) and European Telecommunication Standards Institute (ETSI).

Telco NSMF/Network Slice Subnet Management Function (NSSMF) is characterized to orchestrate and manage Slices of 5G Network Elements (5GNEs) in radio access network (RAN), transport and core domain deployed nationwide. In cloud environments, monitoring by centralized management system (i.e., Samsung Cloud Orchestrator (SCO)) is critical for operational efficiency, closed loop automation and facilitating end-to-end (E2E) network slicing. With telco-specific products such as SCO pursuing cloud-based deployment using microservices architecture, these solutions will have to tackle multiple problems than typical monolithic based software such as Disaster recovery.

The NSMF/Management and Network Orchestrator (MANO) is geo-redundancy unaware, they just work as the traffic is directed by the network. Standby site flavor is same as active, thereby ideal and resource wastage. Currently, NSMF/MANO cannot interface with other sub-systems that are GR-aware (e.g. EMS). This would mean the entire Telco Management system need to be deployed on active and standby. Even if a single sub-system component failure happens, this would affect the entire active-site.

FIG. 3 illustrates the limitation wherein the GR-site cannot be used for compute load-sharing or geographic load-sharing according to the related art.

Referring to FIG. 3, in addition to NSMF, above limitation applies to other management products such as Communication Service Management (CSM), Unified Service Management (USM), Local Service Management (LSM) etc. The problem due to the limitation as mentioned above is that according to the related art, the NSMF is GR-unaware; the NSMF works as the traffic is directed by the network load balancer. The standby site NSMF deployment-flavor is same as active and always in ideal state, thereby leading to resource wastage in cloud native environment. Other sub-systems coordination is also GR-unaware and works as a whole.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide GR-aware NSMF in a wireless network.

Another aspect of the disclosure is to store a GR information of a standby-cloud orchestrator node in a GR controller of the active-cloud orchestrator node by an active-cloud orchestrator node. The GR information comprises a synchronization status and current state of an active-NSMF, standby-NSMF, active EMS and standby EMS.

Another aspect of the disclosure is to retrieve the synchronization status between the active-NSMF and the standby-NSMF and the current state of each of the active-NSMF and the standby-NSMF by the active-NSMF of the active-cloud orchestrator node. The active-cloud orchestrator node is at a first location and the standby-cloud orchestrator node is at a second location.

Another aspect of the disclosure is to determine at least one action to be performed based on the synchronization status and current state of an active-NSMF, standby-NSMF, active EMS and standby EMS by the active-NSMF of the active-cloud orchestrator node.

Another aspect of the disclosure is to perform the at least one action by the active-NSMF of the active-cloud orchestrator node.

Another aspect of the disclosure is to send a data synchronization request message to receive the GR information from a GR controller of the standby-cloud orchestrator node by the GR controller of the active-cloud orchestrator node.

Another aspect of the disclosure is to receive a data synchronization response message comprising the GR information from the GR controller of the standby-cloud orchestrator node by the GR controller of the active-cloud orchestrator node.

Another aspect of the disclosure is to send a GR information request message to receive the GR information from the GR controller of the active-cloud orchestrator node by the active-NSMF of the active-cloud orchestrator node.

Another aspect of the disclosure is to receive a GR information response message comprising the GR information from the GR controller of the active-cloud orchestrator node by the active-NSMF of the active-cloud orchestrator node.

Another aspect of the disclosure is to perform a life cycle management (LCM) operation for at least one of monitoring at least one of an end to end-E2E network slice instance (NSI) event and a network slice subnet instance (NSSI) event, subscribing for events and processing notification from at least one of an EMS, a NSI, a NSSI and network functions (NFs), and monitoring at least one of a NSI, a NSSI fault management (FM), and a performance management (PM).

Another aspect of the disclosure is not to perform an LCM operation for at least one of monitoring at least one of a NSI event and a NSSI event, subscribing for events and processing notification from at least one of an EMS, an NSI, an NSSI and NFs, and monitoring at least one of a NSI, a NSSI FM, and a PM.

Another aspect of the disclosure is to send a registration request message to the active EMS to register the active-NSMF with the active EMS by the active-NSMF of the active-cloud orchestrator node.

Another aspect of the disclosure is to receive a registration response message from the active EMS confirming registration of the active-NSMF with the active EMS by the active-NSMF of the active-cloud orchestrator node.

Another aspect of the disclosure is to send a registration request message to the standby EMS to register the active-NSMF with the standby EMS by the active-NSMF of the active-cloud orchestrator node.

Another aspect of the disclosure is to receive a registration response message from the standby EMS confirming registration of the active-NSMF with the standby EMS by the active-NSMF of the active-cloud orchestrator node.

Another aspect of the disclosure is to send a subscription or publication notification request message to the active EMS to receive notification corresponding to specific events associated with the standby-cloud orchestrator node by the active-NSMF of the active-cloud orchestrator node.

Another aspect of the disclosure is to receive a subscription or publication notification response message from the active EMS confirming subscription for the notification corresponding to specific events associated with the standby-cloud orchestrator node by the active-NSMF of the active-cloud orchestrator node.

Another aspect of the disclosure is to send a subscription or publication notification request message to the standby EMS to receive notification corresponding to specific events associated with the standby-cloud orchestrator node by the active-NSMF of the active-cloud orchestrator node.

Another aspect of the disclosure is to receive a subscription or publication notification response message from the standby EMS confirming subscription for the notification corresponding to specific events associated with the standby-cloud orchestrator node by the active-NSMF of the active-cloud orchestrator node.

Additional aspects will be set forth in part in the description which follows and, in part, will be apparent from the description, or may be learned by practice of the presented embodiments.

In accordance with an aspect of the disclosure, a wireless network system for geo redundancy (GR) aware network slice management function (NSMF) in a wireless network is provided. The wireless network system includes an active-cloud orchestrator node comprising an active-NSMF and a GR controller and a standby-cloud orchestrator node comprising a standby-NSMF and a GR controller, wherein the GR controller of the active-cloud orchestrator node includes memory storing one or more computer programs and one or more processors communicatively coupled to the memory, wherein the one or more computer programs include executable instructions that, when executed by the one or more processors, cause the GR controller to store GR information of a standby-cloud orchestrator node in a GR controller of the active-cloud orchestrator node by an active-cloud orchestrator node, retrieve a synchronization status between the active-NSMF and the standby-NSMF and a current state of each of the active-NSMF and the standby-NSMF by the active-cloud orchestrator node, wherein the active-cloud orchestrator node is at a first location and the standby-cloud orchestrator node is at a second location, determine at least one action to be performed based on the synchronization status between the active-NSMF and the standby-NSMF, the current state of each of the active-NSMF and the standby-NSMF, and the current state of an active element management system (EMS) associated with the active-NSMF and a standby EMS associated with the standby-NSMF by the active-cloud orchestrator node, and perform the at least one action by the active-cloud orchestrator node.

In an embodiment, the GR controller of the active-cloud orchestrator node sends a data synchronization request message to receive the GR information from a GR controller of the standby-cloud orchestrator node. In response, it receives a data synchronization response message comprising the GR information from the GR controller of the standby-cloud orchestrator node.

In an embodiment, the active-NSMF of the active-cloud orchestrator node sends a GR information request message to receive the GR information from the GR controller of the active-cloud orchestrator node. In response, it receives a GR information response message comprising the GR information from the GR controller of the active-cloud orchestrator node.

In an embodiment, the active-NSMF of the active-cloud orchestrator node performs an LCM operation for at least one of monitoring at least one of a NSI event and a NSSI event, subscribing for events and processing notification from at least one of an EMS, an NSI, a NSSI and NFs, and monitoring at least one of a NSI, a NSSI FM, and a PM.

In an embodiment, the active-NSMF of the active-cloud orchestrator node do not perform an LCM operation for at least one of monitoring at least one of a NSI event and a NSSI event, subscribing for events and processing notification from at least one of an EMS, an NSI, a NSSI and NFs, and monitoring at least one of a NSI, a NSSI FM, and a PM.

In an embodiment, the active-NSMF of the active-cloud orchestrator node sends a registration request message to the active EMS to register the active-NSMF with the active EMS. In response, it receives a registration response message from the active EMS confirming registration of the active-NSMF with the active EMS.

In an embodiment, the active-NSMF of the active-cloud orchestrator node sends a registration request message to the standby EMS to register the active-NSMF with the standby EMS. In response, it receives a registration response message from the standby EMS confirming registration of the active-NSMF with the standby EMS.

In an embodiment, the active-NSMF of the active-cloud orchestrator node sends a subscription or publication notification request message to the active EMS to receive notification corresponding to specific events associated with the standby-cloud orchestrator node. In response, it receives a subscription or publication notification response message from the active EMS confirming subscription for the notification corresponding to specific events associated with the standby-cloud orchestrator node.

In an embodiment, the active-NSMF of the active-cloud orchestrator node sends a subscription or publication notification request message to the standby EMS to receive notification corresponding to specific events associated with the standby-cloud orchestrator node. In response, it receives a subscription or publication notification response message from the standby EMS confirming subscription for the notification corresponding to specific events associated with the standby-cloud orchestrator node.

In an embodiment, the active-NSMF performs the LCM operation associated with at least one state of a plurality of states of the LCM operation. The standby-NSMF detects that the active-NSMF is down. After detection, the active-NSMF resumes the LCM operation from the at least one state of the plurality of states of the LCM operation.

In an embodiment, the active-NSMF correlates data from all SB subsystem to create a digested metric data. The active-NSMF further determines ideal resources at the standby-NSMF required to perform the LCM operation of the at least one state of the plurality of states of the LCM operation based on the digested metric data. Finally, the active-NSMF transmits a set of data from the digested metric data to the standby-NSMF to perform the LCM operations based on the ideal resources at the standby-NSMF.

In an embodiment, the active-NSMF correlates data from all SB subsystem to create a digested metric data. Further, the active-NSMF synchronizes by transmitting a set of data from the digested metric data to the standby-NSMF based on at least one parameter associated with the standby-NSMF.

In accordance with another aspect of the disclosure, a method for geo redundancy (GR) aware network slice management function (NSMF) in a wireless network is provided. The method includes storing, by an active-cloud orchestrator node, a GR information of a standby-cloud orchestrator node in a GR controller of the active-cloud orchestrator node, retrieving, by the active-cloud orchestrator node, a synchronization status between an active-NSMF and a standby-NSMF and a current state of each of the active-NSMF and the standby-NSMF, wherein the active-cloud orchestrator node is at a first location and the standby-cloud orchestrator node is at a second location, determining, by the active-cloud orchestrator node, at least one action to be performed based on the synchronization status between the active-NSMF and the standby-NSMF, the current state of each of the active-NSMF and the standby-NSMF, and the current state of an active element management system (EMS) associated with the active-NSMF and a standby EMS associated with the standby-NSMF, and performing, by the active-cloud orchestrator node, the at least one action.

In accordance with another aspect of the disclosure, one or more non-transitory computer-readable storage media storing one or more computer programs including computer-executable instructions that, when executed by one or more processors of an electronic device, cause the electronic device to perform operations are provided. The operations include storing, by an active-cloud orchestrator node, geo redundancy (GR) information of a standby-cloud orchestrator node in a GR controller of the active-cloud orchestrator node, retrieving, by the active-cloud orchestrator node, a synchronization status between an active-network slice management function (NSMF) and a standby-NSMF and a current state of each of the active-NSMF and the standby-NSMF, wherein the active-cloud orchestrator node is at a first location and the standby-cloud orchestrator node is at a second location, determining, by the active-cloud orchestrator node, at least one action to be performed based on the synchronization status between the active-NSMF and the standby-NSMF, the current state of each of the active-NSMF and the standby-NSMF, and the current state of an active element management system (EMS) associated with the active-NSMF and a standby EMS associated with the standby-NSMF, and performing, by the active-cloud orchestrator node, the at least one action.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF INVENTION

Figure 1:
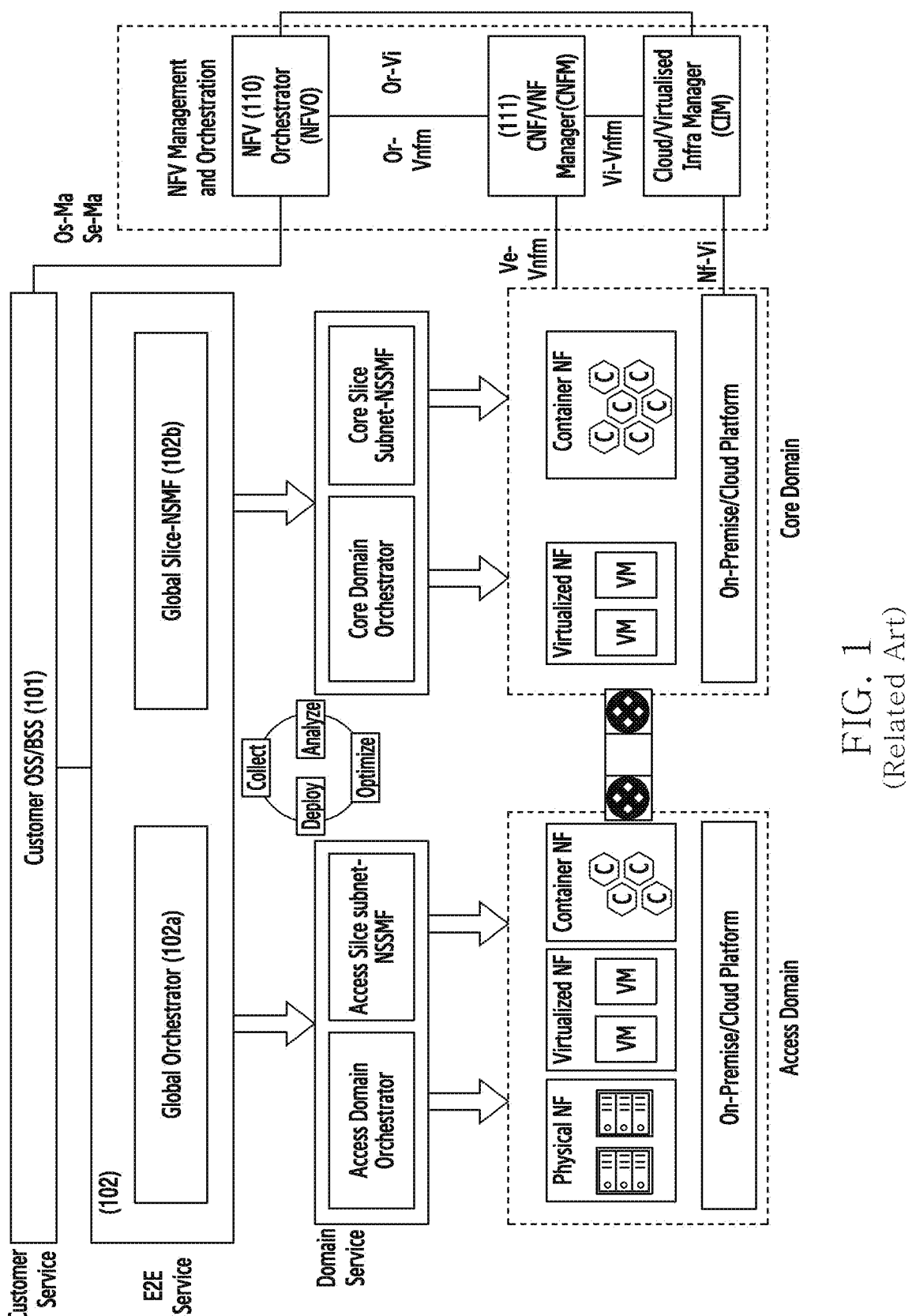
FIG. 1 is a block diagram that illustrates an orchestration tier in Telco, according to the related art.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments are described and illustrated in terms of blocks that carry out a described function or functions. These blocks, which are referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and optionally be driven by firmware and software. The circuits, for example, be embodied in one or more semiconductor chips, or on substrate supports such as printed circuit boards and the like. The circuits constituting a block be implemented by dedicated hardware, or by a processor (e.g., one or more programmed microprocessors and associated circuitry), or by a combination of dedicated hardware to perform some functions of the block and a processor to perform other functions of the block. Each block of the embodiments be physically separated into two or more interacting and discrete blocks without departing from the scope of the proposed method. Likewise, the blocks of the embodiments be physically combined into more complex blocks without departing from the scope of the proposed method.

The accompanying drawings are used to help easily understand various technical features and it is understood that the embodiments presented herein are not limited by the accompanying drawings. As such, the proposed method is construed to extend to any alterations, equivalents and substitutes in addition to those which are particularly set out in the accompanying drawings. Although the terms first, second, etc. used herein to describe various elements, these elements are not be limited by these terms. These terms are generally used to distinguish one element from another.

The following abbreviations are used in the description:
CSMF: Communication Service Management Function
NSMF: Network Slice Management Function
NSI: End to End-E2E Network Slice Instance
NSSMF: Network Slice Subnet Management Function
NSSI: Network Slice Subnet Instance
TMF: Tele Management Forum
EMS: Element Management System
3GPP: The 3rd Generation Partnership Project
ORAN: Open Radio Access Network
MANO: Management and Network Orchestrator
RAN-NSSMF: Radio Access Network-NSSMF
GR: Geo Redundancy
SCO: Samsung Cloud Orchestrator
CO: Cloud Orchestrator
USM: Unified Service Management
EMS: Element Management System
OP: Operational Site (Active)
DR: Disaster Recovery Site (Standby)
I/F: Interface (Can be any of NBI-North or SBI-South or EBI-East or WBI-West)
LCM: Life Cycle Management
CNI: Container Native Infrastructure
NF: Network Function (physical-PNF/virtual-VNF/container-CNF)
CNFM/VNFM: CNF/VNF Manager
CIM/VIM: Cloud/Virtualized Infra Manager Throughout the description, the terms "active site" and "active cloud orchestrator node" are used interchangeably.

Throughout the description, the terms "standby site" and "standby cloud orchestrator node" are used interchangeably.

Throughout the description, the terms "Heartbeat" and "data synchronization request message and data synchronization response message" are used interchangeably.

Embodiments disclosed herein provide a method for GR-aware Network Slice Management Function (NSMF) in a wireless network. The method includes storing a GR information of a standby-cloud orchestrator node in a GR controller of the active-cloud orchestrator node by an active-cloud orchestrator node. The GR information comprises a synchronization status between an active-NSMF of the active-cloud orchestrator node and a standby-NSMF of the standby-cloud orchestrator node. The GR information also comprises a current state of each of the active-NSMF of the active-cloud orchestrator node and the standby-NSMF of the standby-cloud orchestrator node, and a current state an active Element Management System (EMS) associated with the active-NSMF and a standby EMS associated with the standby-NSMF. Further, the method includes retrieving, by the active-NSMF of the active-cloud orchestrator node, the synchronization status between the active-NSMF and the standby-NSMF and the current state of each of the active-NSMF and the standby-NSMF. The active-cloud orchestrator node is at a first location and the standby-cloud orchestrator node is at a second location. The method further includes determining, by the active-NSMF of the active-cloud orchestrator node, at least one action to be performed based on the synchronization status between the active-NSMF and the standby-NSMF, the current state of each of the active-NSMF and the standby-NSMF, and the current state the active EMS associated with the active-NSMF and the standby EMS associated with the standby-NSMF.

Finally, the method includes performing, by the active-NSMF of the active-cloud orchestrator node, the at least one action.

Embodiments disclosed herein provides a wireless network apparatus for GR-aware NSMF in a wireless network. The wireless network system includes an active-cloud orchestrator node comprising an active-NSMF and a GR controller and a standby-cloud orchestrator node comprising a standby-NSMF and a GR controller. The GR-Controller of the active-cloud orchestrator node is configured to store a GR information of a standby-cloud orchestrator node in a GR controller of the active-cloud orchestrator node. The GR information comprises a synchronization status between an active-NSMF of the active-cloud orchestrator node and a standby-NSMF of the standby-cloud orchestrator node. The GR information further comprises a current state of each of the active-NSMF of the active-cloud orchestrator node and the standby-NSMF of the standby-cloud orchestrator node, and a current state an active EMS associated with the active-NSMF and a standby EMS associated with the standby-NSMF. The GR controller, further retrieves the synchronization status between the active-NSMF and the standby-NSMF and the current state of each of the active-NSMF and the standby-NSMF. The active-cloud orchestrator node is at a first location and the standby-cloud orchestrator node is at a second location. The GR controller determines at least one action to be performed. The action to be performed is based on the synchronization status between the active-NSMF and the standby-NSMF, the current state of each of the active-NSMF and the standby-NSMF, and the current state the active EMS associated with the active-NSMF and the standby EMS associated with the standby-NSMF. Finally, the GR controller performs the at least one action.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a micropro-cessor unit (MPU), a system on chip (SoC), an integrated circuit (IC), or the like.

FIG. 1 is a block diagram that illustrates an orchestration tier in Telco, according to the related art.

Referring to FIG. 1, the cloud-based network functions virtualization (NFV) system employs a layered architecture for service management and provisioning.

The service layer orchestrates service delivery through the E2E service block 102. The global orchestrator 102a acts as the central control unit, coordinating virtual NF (VNF) deployment, and service orchestration. Additionally, the global slice-NSMF (102b) manages network slices.

Customer requests flow from the customer service interface through the customer operational support system (OSS)/basic service set (BSS) 101 to the E2E service 102, which then communicates with the global orchestrator 102a for service provisioning. The global orchestrator 102a works with the global slice-NSMF 102b to determine the appropriate network slice and interacts with the network function virtualization orchestrator (NFVO) 110 for VNF deployment. The NFVO 110 leverages domain service orchestra-tors for domain-specific VNF management. Finally, the VNF manager (VNFM)/container NF manager (CNFM) 111 manages the deployed VNF lifecycle based on the chosen deployment type. This layered architecture is utilized for management of network services within the cloud-based NFV system.

Figure 2:
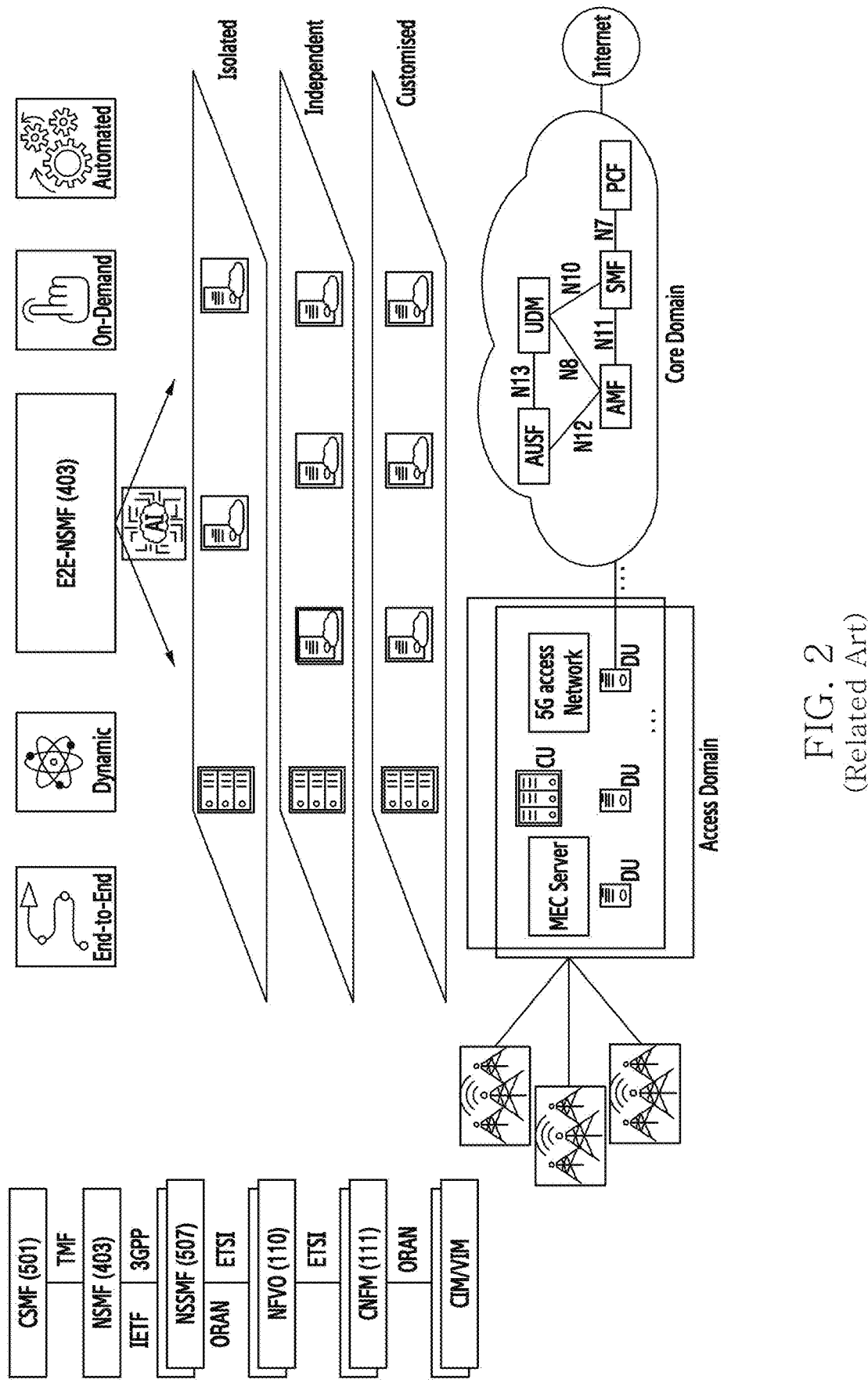
FIG. 2 is a block diagram that illustrates a Network Slicing in Telco, according to the related art.

FIG. 2 is a block diagram that illustrates a Network Slicing in Telco, according to the related art.

Referring to FIG. 2, the E2E-NSMF 403 manages communication service management function (CSMF) 501 for service delivery and NSSMF 507 for resource allocation within network slices. NSSMF 507 interacts with the core network and the access network to configure resources. The CSMF 501 directly interacts with the core network to deliver communication services. This layered approach facilitates the creation of isolated network slices on a shared infra-structure.

Figure 3:
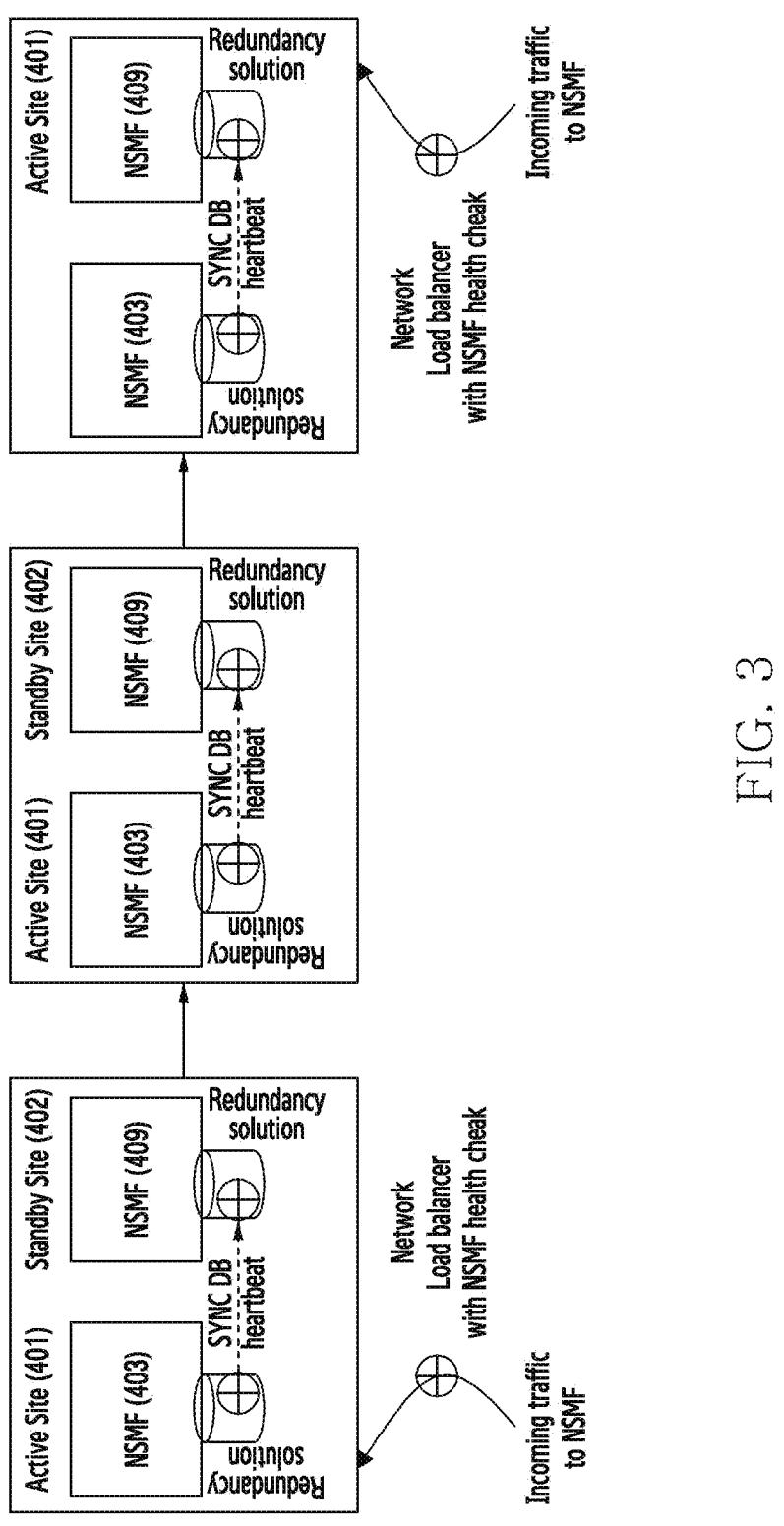
FIG. 3 is a block diagram that illustrates the GR-unaware NSMF, according to the related art.

FIG. 3 is a block diagram that illustrates the GR-unaware NSMF, according to the related art.

Referring to FIG. 3, geographically separated active-standby sites for network operation are shown. Each site has an active site handling traffic and a corresponding standby site. A network load balancer performs NSMF health check. The heartbeat transfers the date from the active site to the standby site. A heartbeat mechanism monitors the active site's health, triggering the standby site to become active upon failure. However, the NSMF lacks GR-awareness, treating both sites equally. Additionally, standby sites utilize the same resources as active sites, potentially leading to inefficiency. This system offers fault tolerance but could be improved by optimizing NSMF for redundancy and enabling standby site utilization for tasks beyond failover.

According to the related art, the NSMF is GR-unaware. The NSMF works as the traffic is directed by the wireless network. The standby site flavor is the same as the active site, thereby causing ideal and resource wastage. Also, the NSMF cannot interface with other sub-systems that are GR-aware (e.g. EMS). This means the entire Telco Man-agement system needs to be deployed on active and standby. Even if a single sub-system component failure happens, it affects the entire active-site.

According to the proposed technical solution, the NSMFs are deployed geographically apart and has heartbeat mecha-nism in place by a GR Controller. The GR Controller obtains the GR information through heartbeat mechanism and makes the NSMF GR-aware. With regards to interfacing with other sub-systems i.e. EMS, the GR Controller registers the address of both active/standby EMS onto the NSMF. This means that GR-aware NSMF can interface with both active/standby EMS. With such GR-awareness, the NSMF can leverage numerous benefits such as, slice-type/service level agreement-based load sharing between active and standby NSMF, compute/geo-graphic proximity-based load sharing between active and standby NSMF, etc.

The proposed technical solution brings GR-awareness to underlying NSMF deployed on Cloud-Native ecosystem. With such GR-awareness from proposed framework, NSMF can leverage numerous benefits such as, slice-type/service level agreement-based load sharing between active and standby NSMF, compute/geo-graphic proximity-based load sharing between active and standby NSMF, etc. It also makes it possible to leverage the NSMF deployed on both active/standby site rather than only on active-NSMF.

Referring now to the drawings, and more particularly to FIGS. 4, 5, 6A, 6B, 7, 8, 9A to 9D, and 10 to 17, where similar reference characters denote corresponding features consistently throughout the figures, there are shown embodiments.

Figure 4:
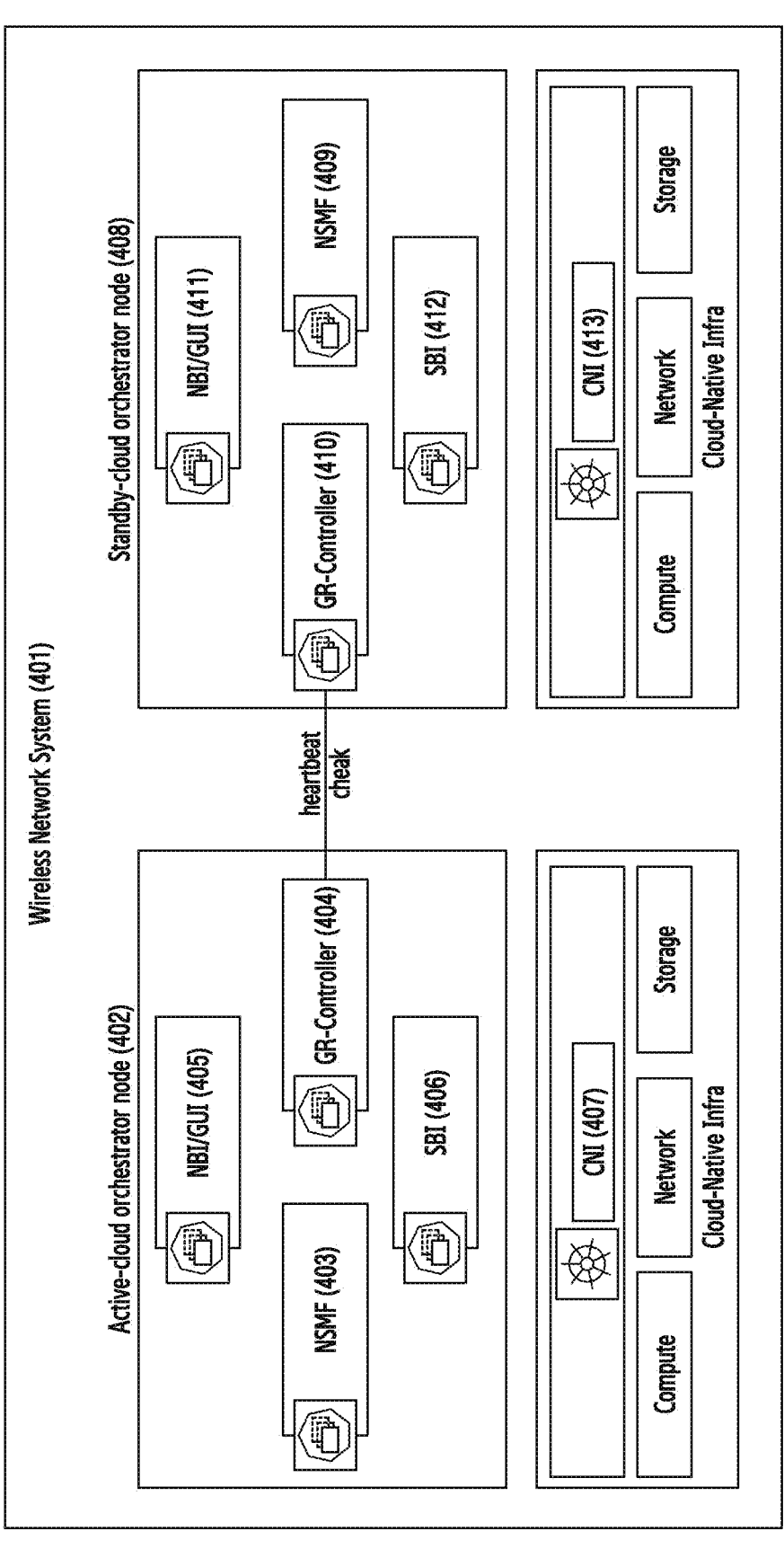
FIG. 4 is a block diagram that illustrates various hardware components of the wireless network apparatus for GR-aware NSMF in a wireless network, according to an embodiment of the disclosure.

FIG. 4 is a block diagram that illustrates various hardware components of the wireless network system for GR-aware NSMF in a wireless network, according to an embodiment of the disclosure.

Referring to FIG. 4, the wireless network system 401 includes an active-cloud orchestrator node 402 comprising an active-NSMF 403 and a GR controller 404 and a standby-cloud orchestrator node 408 comprising a standby-NSMF 409 and a GR controller 410. The active-cloud orchestrator node 402 further includes a North Bound Interface (NBI) 405 and a South Bound Interface (SBI) 406. The standby-cloud orchestrator node 402 further includes NBI 411 and SBI 412. Each of the active-cloud orchestrator node 402 and the standby-cloud orchestrator node 408 also comprises Container Native Infrastructure (CNI) 407 and 413. Each of The CNI 407 and the CNI 413 includes cloud native infra comprising compute, network and storage functions.

The GR controller 404 of the active-cloud orchestrator node 402 is an innovative hardware that is realized through the physical implementation of both analog and digital circuits, including logic gates, integrated circuits, microprocessors, microcontrollers, memory circuits, passive and active electronic components, as well as optical components.

The GR controller 404 stores GR information of a standby-cloud orchestrator node 408 in a GR controller of the active-cloud orchestrator node 402. The GR information comprises a synchronization status between an active-NSMF 403 of the active-cloud orchestrator node 402 and a standby-NSMF 409 of the standby-cloud orchestrator node 408. The GR information further comprises a current state of each of the active-NSMF 403 of the active-cloud orchestrator node 402 and the standby-NSMF 409 of the standby-cloud orchestrator node 408, and a current state an active EMS associated with the active-NSMF 403 and a standby EMS associated with the standby-NSMF 409. The GR controller 404 further retrieves the synchronization status between the active-NSMF 403 and the standby-NSMF 409 and the current state of each of the active-NSMF 403 and the standby-NSMF 409. The active-cloud orchestrator node 402 is at a first location and the standby-cloud orchestrator node is at a second location. The GR controller 404 determines at least one action to be performed. The at least one action to be performed is based on the synchronization status between the active-NSMF 403 and the standby-NSMF 409, the current state of each of the active-NSMF 403 and the standby-NSMF 409, and the current state the active EMS associated with the active-NSMF 403 and the standby EMS associated with the standby-NSMF 409. Finally, the GR controller 404 performs the at least one action.

The GR controller 404 of the active-cloud orchestrator node 402 may send a data synchronization request message to receive the GR information from a GR controller 410 of the standby-cloud orchestrator node 408. In response, the GR controller 404 receives a data synchronization response message comprising the GR information from the GR controller 410 of the standby-cloud orchestrator node 408.

The active-NSMF 403 of the active-cloud orchestrator node 402 may send a GR information request message to receive the GR information from the GR controller 404 of the active-cloud orchestrator node 402. In response, the active-NSMF 403 receives a GR information response message comprising the GR information from the GR controller 404 of the active-cloud orchestrator node 402.

The active-NSMF 403 of the active-cloud orchestrator node 402 may perform an LCM operation for at least one of monitoring at least one of a NSI event and a NSSI event, subscribing for events and processing notification from at least one of an EMS, an NSI, a NSSI and NFs, and monitoring at least one of a NSI, a NSSI FM, and a PM.

The active-NSMF 403 of the active-cloud orchestrator node 402 do not perform an LCM operation for at least one of monitoring at least one of a NSI event and a NSSI event, subscribing for events and processing notification from at least one of an EMS, an NSI, a NSSI and NFs, and monitoring at least one of a NSI, a NSSI FM, and a PM. For example, the active-NSMF 403 may skip (or refrain from, cease, stop) performing the LCM operation for at least one of monitoring at least one of a NSI event and a NSSI event, subscribing for events and processing notification from at least one of an EMS, an NSI, a NSSI and NFs, and monitoring at least one of a NSI, a NSSI FM, and a PM.

The active-NSMF 403 of the active-cloud orchestrator node 402 may send a registration request message to the active EMS to register the active-NSMF 403 with the active EMS. In response, the active-NSMF 403 receives a registration response message from the active EMS confirming registration of the active-NSMF 403 with the active EMS.

The active-NSMF 403 of the active-cloud orchestrator node 402 may send a registration request message to the standby EMS to register the active-NSMF 403 with the standby EMS. In response, the active-NSMF 403 receives a registration response message from the standby EMS confirming registration of the active-NSMF 403 with the standby EMS.

The active-NSMF 403 of the active-cloud orchestrator node 402 may send a subscription or publication notification request message to the active EMS to receive notification corresponding to specific events associated with the standby-cloud orchestrator node 408. In response, the active-NSMF 403 receives a subscription or publication notification response message from the active EMS confirming subscription for the notification corresponding to specific events associated with the standby-cloud orchestrator node 408.

The active-NSMF 403 of the active-cloud orchestrator node 402 may send a subscription or publication notification request message to the standby EMS to receive notification corresponding to specific events associated with the standby-cloud orchestrator node 408. In response, the active-NSMF 403 receives a subscription or publication notification response message from the standby EMS confirming subscription for the notification corresponding to specific events associated with the standby-cloud orchestrator node 408.

The active-NSMF 403 may perform the LCM operation associated with at least one state of a plurality of states of the LCM operation. The standby-NSMF 409 detects that the active-NSMF 403 is down. After detection, the active-NSMF 403 resumes the LCM operation from the at least one state of the plurality of states of the LCM operation.

The active-NSMF 403 may correlate data from all SB subsystem to create a digested metric data. The active-NSMF 403 further determines ideal resources at the standby-NSMF 409 required to perform the LCM operation of the at least one state of the plurality of states of the LCM operation based on the digested metric data. Finally, the active-NSMF 403 transmits a set of data from the digested metric data to the standby-NSMF 409 to perform the LCM operations based on the ideal resources at the standby-NSMF 4_oi._

The active-NSMF 403 may correlate data from all SB subsystem to create a digested metric data. Further, the active-NSMF 403 synchronizes by transmitting a set of data from the digested metric data to the standby-NSMF 409 based on at least one parameter associated with the standby-NSMF 409.

The NSMF is GR aware by interfacing with its local GR controller, based on which multiple functional difference are internally made to optimize performance and guaranty lower downtime in case of failure. The scope of utilizing Active-Active is Active and Active mode SYNC configuration for GR is unsuitable for Telco environment because when geographic location is far apart, the SYNC can take longer and can lead to NSMF performance degradation. Also, DB SYNC active-active consistency is not possible when replicas separate geographically apart (>100 ms).

Figure 5:
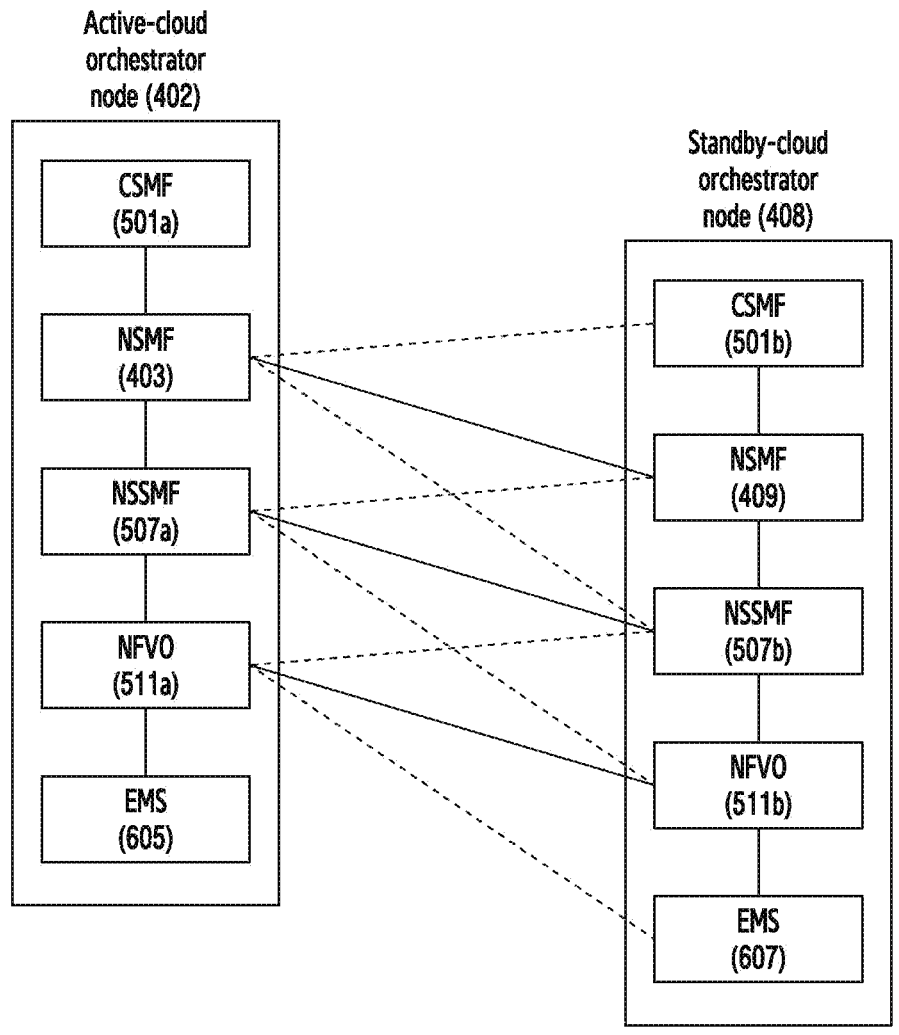
FIG. 5 is a block diagram that illustrates components of an active-cloud orchestrator node and a standby-cloud orchestrator node, according to an embodiment of the disclosure.

FIG. 5 is a block diagram that illustrates components of an active-cloud orchestrator node and a standby-cloud orchestrator node, according to an embodiment of the disclosure.

Referring to FIG. 5, each cloud orchestrator node comprises of several different components. A Cloud Service Management Framework (CSMF) 501*a* and 501*b* is responsible for managing the lifecycle of cloud services. A Network Service Management Framework (NSMF) 403 and 409 manages the lifecycle of network services. A Network Slice Service Management Framework (NSSMF) 507*a* and 507*b* manages the lifecycle of network slice services. A Network Function Virtualization Orchestrator (NFVO) 511*a* and 511*b* is responsible for managing the lifecycle of network functions. The EMS 605 and 607 manages individual cloud resources. These components of the active-cloud orchestrator node 402 and the standby-cloud orchestrator node 408 are connected by a standby connection and a Heartbeat.

The standby-cloud orchestrator node 408 is a backup to the active-cloud orchestrator node 402, and can take over if the active-cloud orchestrator node 402 fails. This helps to ensure that cloud services are always available.

Figure 6A:
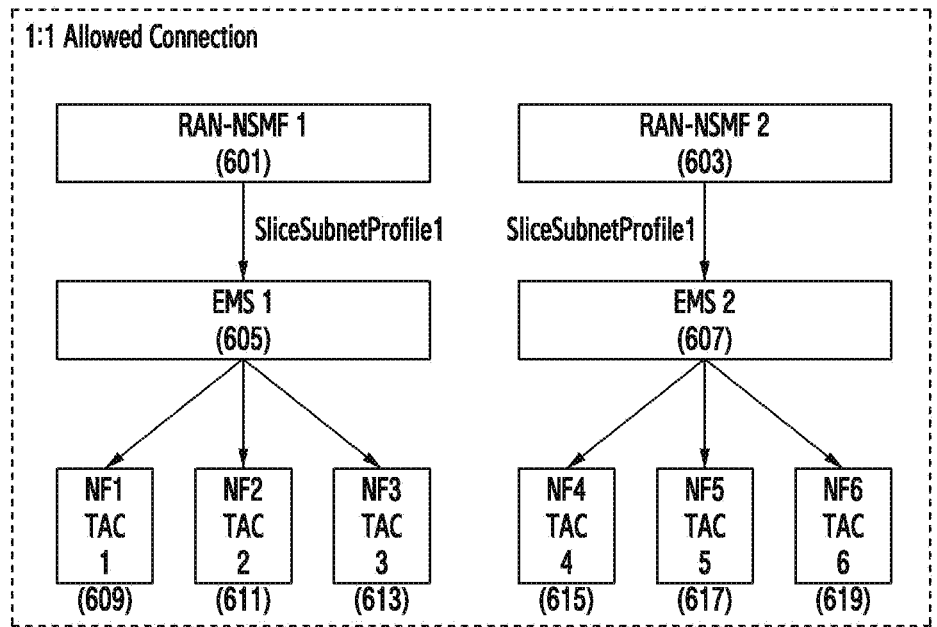
FIGS. 6A and 6B are block diagrams that illustrates the allowed and unallowed connections when the NSMF is 1: N connected to the USM/EMS, according to various embodiments of the disclosure.
Figure 6B:
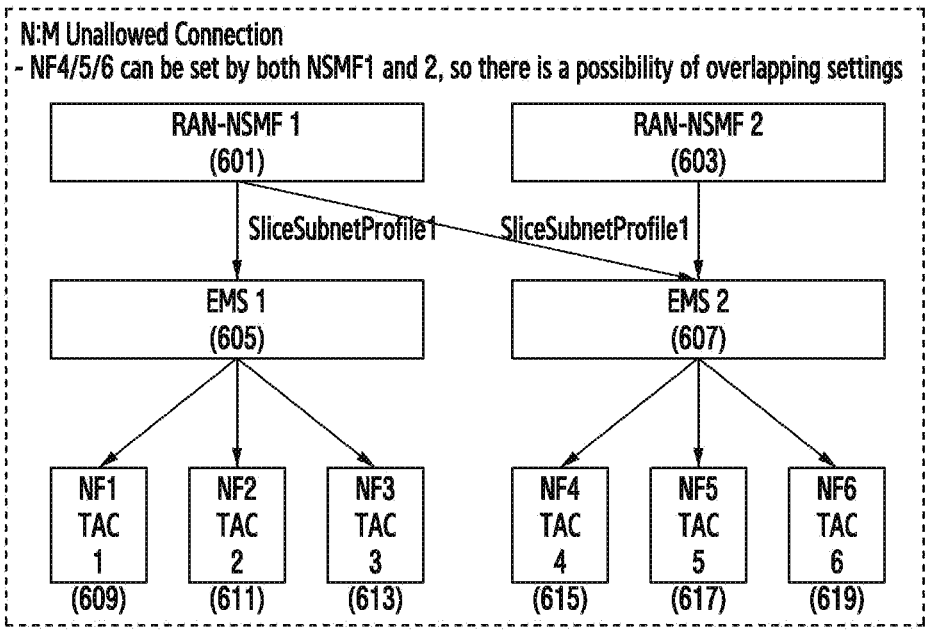

FIGS. 6A and 6B are block diagrams that illustrates the allowed and unallowed connections when the NSMF is 1: N connected to the USM/EMS, according to various embodiments of the disclosure.

Referring to FIGS. 6A and 6B, both the NSMF and the NSSMF blocks are referred as the NSMF. Also, the NSMF is 1: N connected to the USM/EMS (where N=1, 2, 3, . . . ). For Design Rationale NF is managed with one USM and NSMF. In the case of N:M, different NSMFs may duplicate the same slice-related settings for the same NF, which may cause unwanted configuration duplication and operation errors.

FIG. 6A illustrates that RAN-NSMF 1 601 and the RAN-NSMF 2 603 are allowed connections only with the EMS 1 605 and EMS 2 607 respectively. Further, the EMS 1 605 can be mapped with NF1 609, NF2 611 and NF3 613 and the EMS 2 can be mapped with NF4 615, NF5 617 and NF6 619 only.

FIG. 6B illustrates that the connection of RAN-NSMF 1 601 with EMS 1 605 and EMS 2 607 simultaneously is unallowed connection. The NF4 615, NF5 617 and NF6 619 can be set by both RAN-NSMF 1 601 and the RAN-NSMF 2 603, so there is a possibility of overlapping settings.

Figure 7:
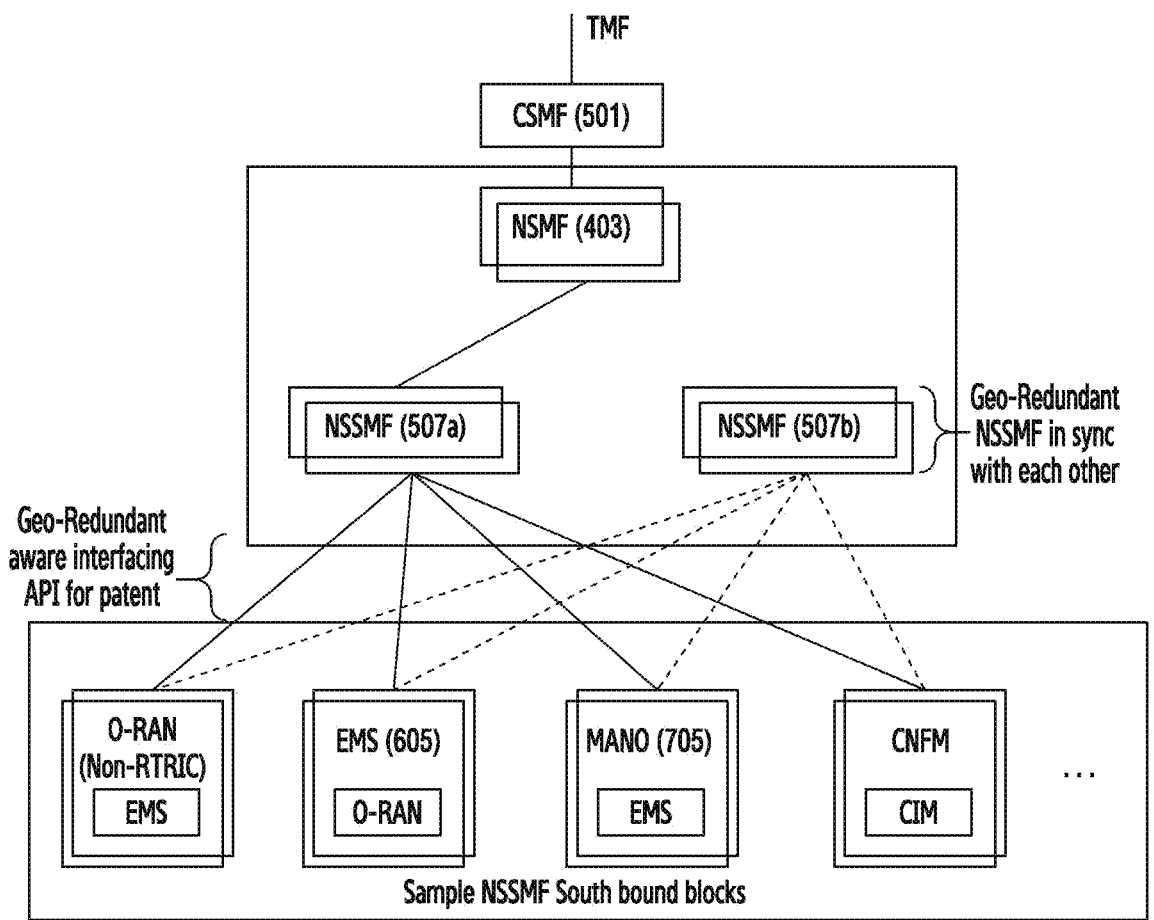
FIG. 7 is a block diagram that illustrates the slicing management by NSMF/NSSMF towards SB, according to an embodiment of the disclosure.

FIG. 7 is a block diagram that illustrates the slicing management by NSMF/NSSMF towards SB, according to an embodiment of the disclosure.

Referring to FIG. 7, the Geo-Redundant aware interfacing API is developed for DISH and Global in SVR23A. Also, GR NSSMFs is in sync with each other. The system comprises a sample NSSMF South bound blocks for slice management and follows the 3GPP TS 28.531 and 3GPP TS 28.532.

Figure 8:
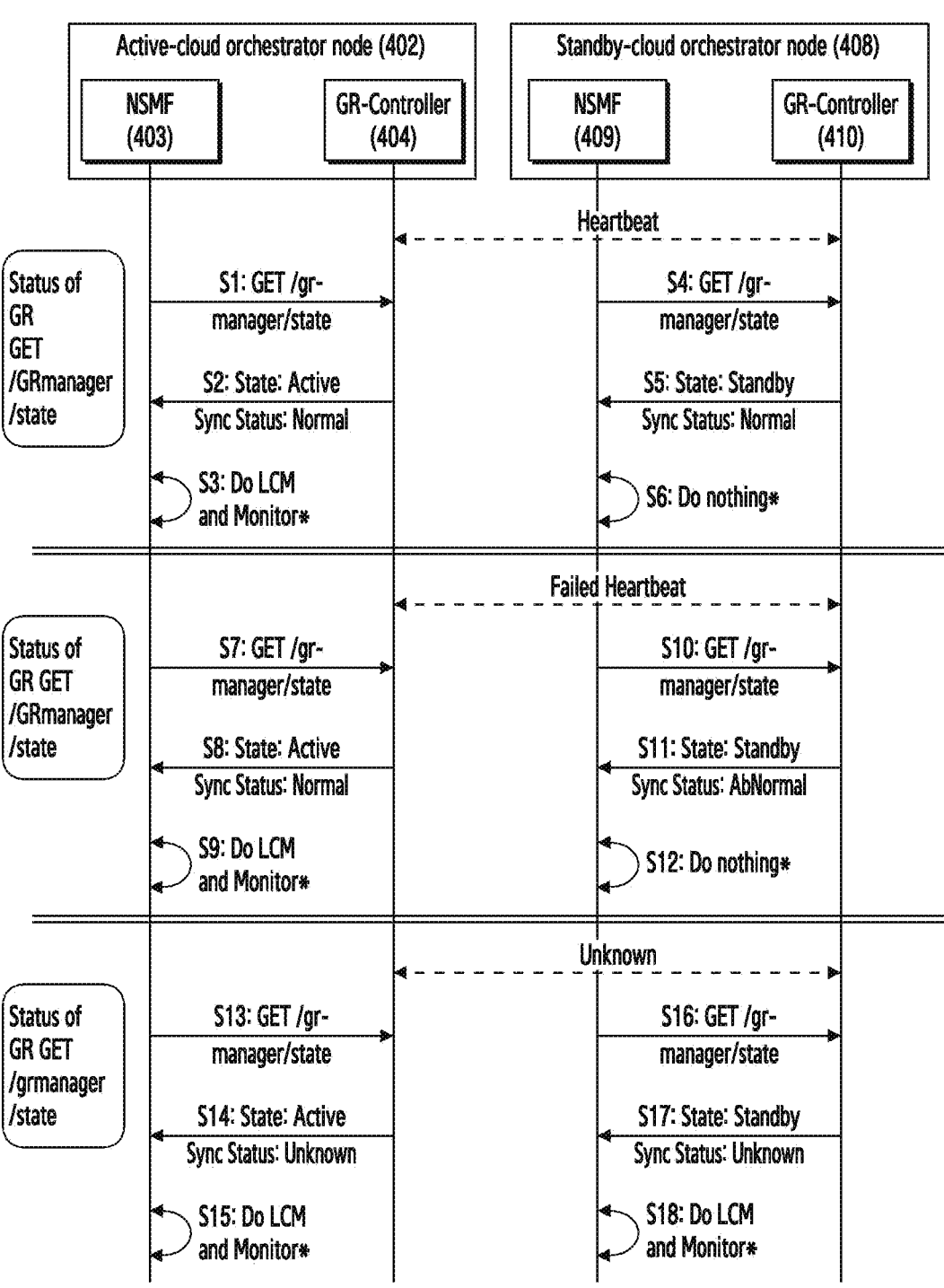
FIG. 8 is a sequence diagram that illustrates a GR-aware NSMF in a wireless network, according to an embodiment of the disclosure.

FIG. 8 is a sequence diagram that illustrates a GR-aware NSMF in a wireless network, according to an embodiment of the disclosure.

Referring to FIG. 8, the active-cloud orchestrator node 402 includes NSMF 403 and GR-Controller 404. The Standby-cloud orchestrator node 408 includes NSMF 409 and GR-Controller 410. The process starts with an active cloud orchestrator node 402 and standby cloud orchestrator node 408 communicating with each other periodically using a "Heartbeat" signal. At operation S1, the active cloud orchestrator node 402 initiates the process by querying its GR-Controller 404 for its current operational status through NSMF 403. For example, the NSMF 403 may send, to the GR-Controller 404, a GR information request message to receive the GR information from the GR controller 404 of the active-cloud orchestrator node 402.

At operation S2, the GR-Controller 404 at the active cloud orchestrator node 402 responds by sending the current state information back to the NSMF 403. The current sync state information is a normal state. For example, the NSMF 403 may receive a GR information response message comprising the GR information (e.g., the current state information, the current sync state information) from the GR-controller 404.

At operation S3, the NSMF 403 performs the Life Cycle Management (LCM) and monitors further.

At operation S4, the standby cloud orchestrator node 408 initiates the process by querying its GR-Controller 410 for its current operational status through NSMF 409.

At operation S5, the GR-Controller 410 at the standby cloud orchestrator node 408 responds by sending the current state information back to the NSMF 409. The current sync state information is a normal state.

At operation S6, the NSMF 409 becomes Idle and does nothing.

When the communication between the active cloud orchestrator node 402 and the standby cloud orchestrator node 408 results in a "Failed Heartbeat" signal, then at operation S7, the active cloud orchestrator node 402 initiates the process by querying the GR-Controller 404 for a current operational status through NSMF 403.

At operation S8, the GR-Controller 404 at the active cloud orchestrator node 402 responds by sending the current state information back to the NSMF 403. The current sync state information is an abnormal state.

At operation S9, the NSMF 403 performs the Life Cycle Management (LCM) and monitors further.

At operation S10, the standby cloud orchestrator node 408 initiates the process by querying the GR-Controller 410 for a current operational status through NSMF 409.

At operation S11, the GR-Controller 410 at the standby cloud orchestrator node 408 responds by sending the current state information back to the NSMF 409. The current sync state information is an abnormal state.

At operation S12, the NSMF 409 becomes Idle and does nothing.

When the communication between the active cloud orchestrator node 402 and the standby cloud orchestrator node 408 results in an "Unknown", then at operation 813, the active cloud orchestrator node 402 initiates the process by querying the GR-Controller 404 for current operational status through NSMF 403.

At operation S14, the GR-Controller 404 at the active cloud orchestrator node 402 responds by sending the current state information back to the NSMF 403. The current sync state information is an unknown state.

At operation S15, the NSMF 403 performs the Life Cycle Management (LCM) and monitors further.

At operation S16, the standby cloud orchestrator node 408 initiates the process by querying the GR-Controller 410 for a current operational status through NSMF 409.

At operation S17, the GR-Controller 410 at the standby cloud orchestrator node 408 responds by sending the current state information back to the NSMF 409. The current sync state information is an unknown state.

At operation S18, the NSMF 409 performs the Life Cycle Management (LCM) and monitors further.

TABLE 1

| Summary of interfacing | | |
| --- | --- | --- |
| Sync Status | State | NSMF Behavior |
| Normal | Active | Do LCM & Monitoring |
| Normal | Standby | Do nothing or Monitoring |
| Abnormal | Active | Do LCM & Monitoring |
| Abnormal | Standby | Do nothing or Monitoring |
| Unknown | Active | Do LCM & Monitoring |
| Unknown | Standby | Do LCM & Monitoring |

Table 1 illustrates the NSMF behavior based on the sync states, state of the active cloud orchestrator node 402 and the standby cloud orchestrator node 408.

FIGS. 9A, 9B, 9C, and 9D are block diagrams that illustrates an overview of connection configuration of NSMF active-standby and EMS active-standby structure, according to various embodiments of the disclosure.

Figure 9A:
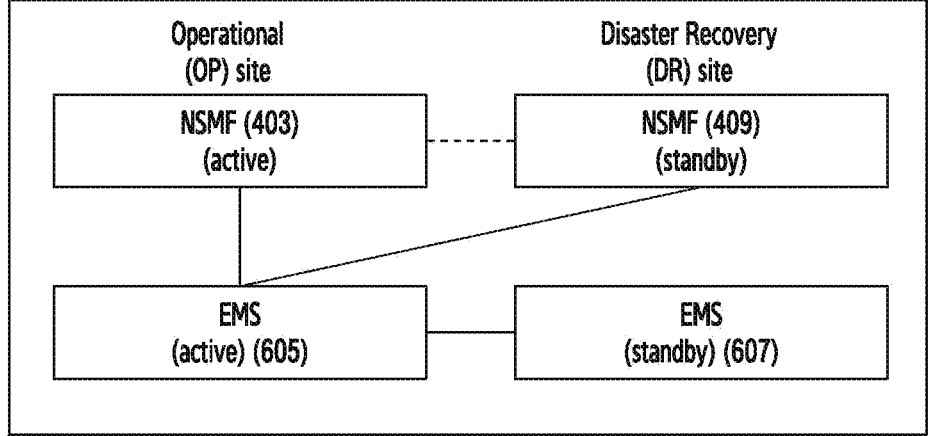
FIGS. 9A, 9B, 9C, and 9D are block diagrams that illustrates an overview of connection configuration of NSMF active-standby and EMS active-standby structure, according to various embodiments of the disclosure.

Referring to FIG. 9A, an Operational (OP) site and Disaster Recovery (DR) site are illustrated. The OP site further comprises an active NSMF 403 and an active EMS 605. The DR site further comprises a standby NSMF 409 and a standby EMS 607. The active NSMF 403 performs registration with both GR paired active EMS 605 and standby EMS 607. The active EMS 605 creates a heartbeat connection separately with the active NSMF 403, the standby NSMF 409, and the standby EMS 607.

Figure 9B:
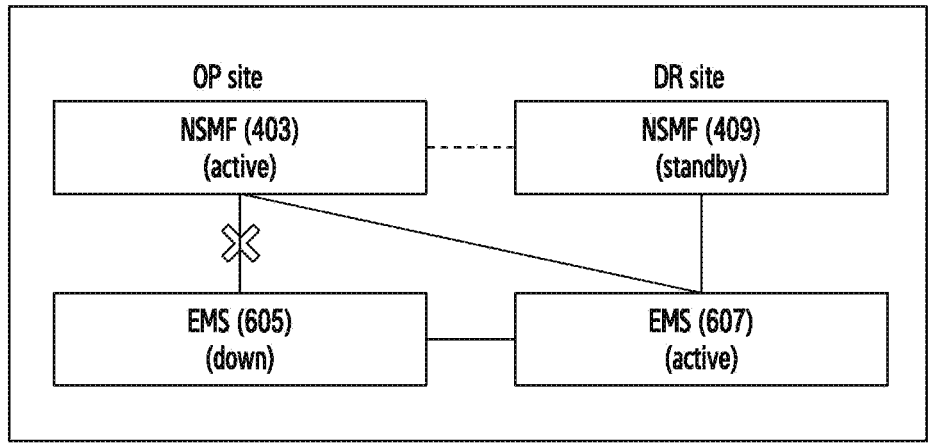

Referring to FIG. 9B, when the active EMS 605 goes down, then the active NSMF 403 connects with the standby EMS 607 and sets the standby EMS 607 as active EMS. The new active EMS 607 creates a heartbeat connection separately with the active NSMF 403, the standby NSMF 409, and the EMS 605.

Figure 9C:
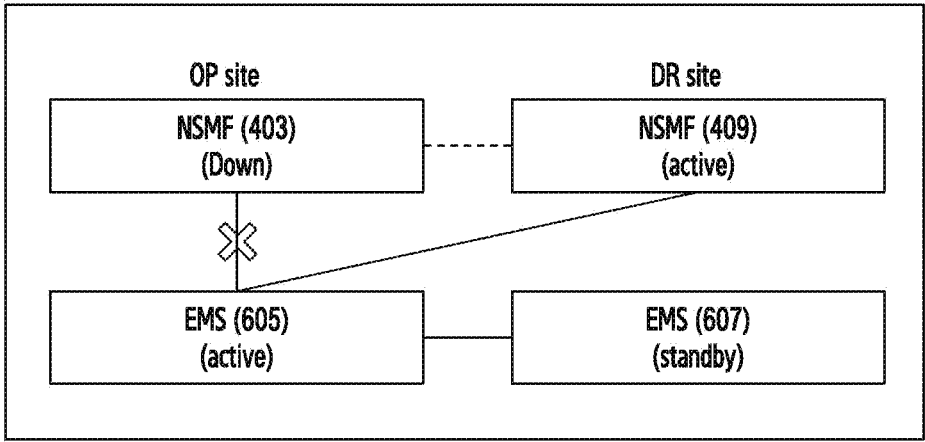

Referring to FIG. 9C, when the active NSMF 403 goes down, then the active EMS 605) connects with the standby NSMF 409 and the standby NSMF 409 as the active NSMF 409. The new active NSMF 409 takes over and continues the connection.

Figure 9D:
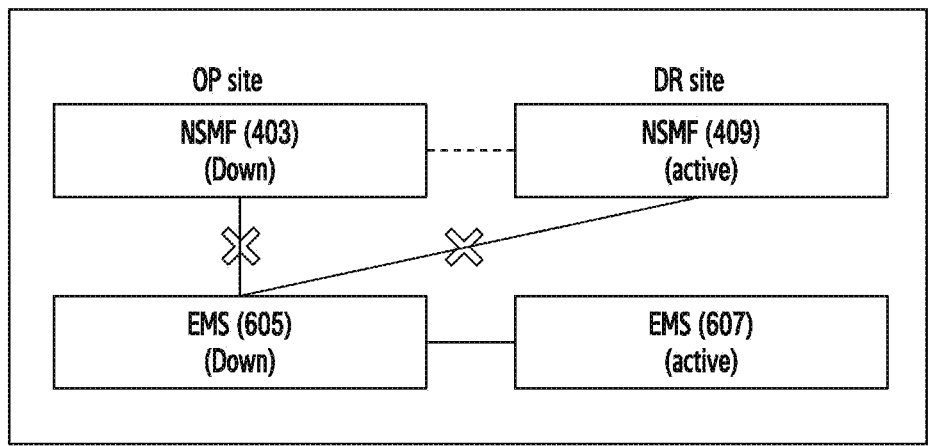

Referring to FIG. 9D, when the NSMF 403 and EMS 605 both goes down, then the standby NSMF 409 and standby EMS 607 takes over and continue the connection.

Figure 10:
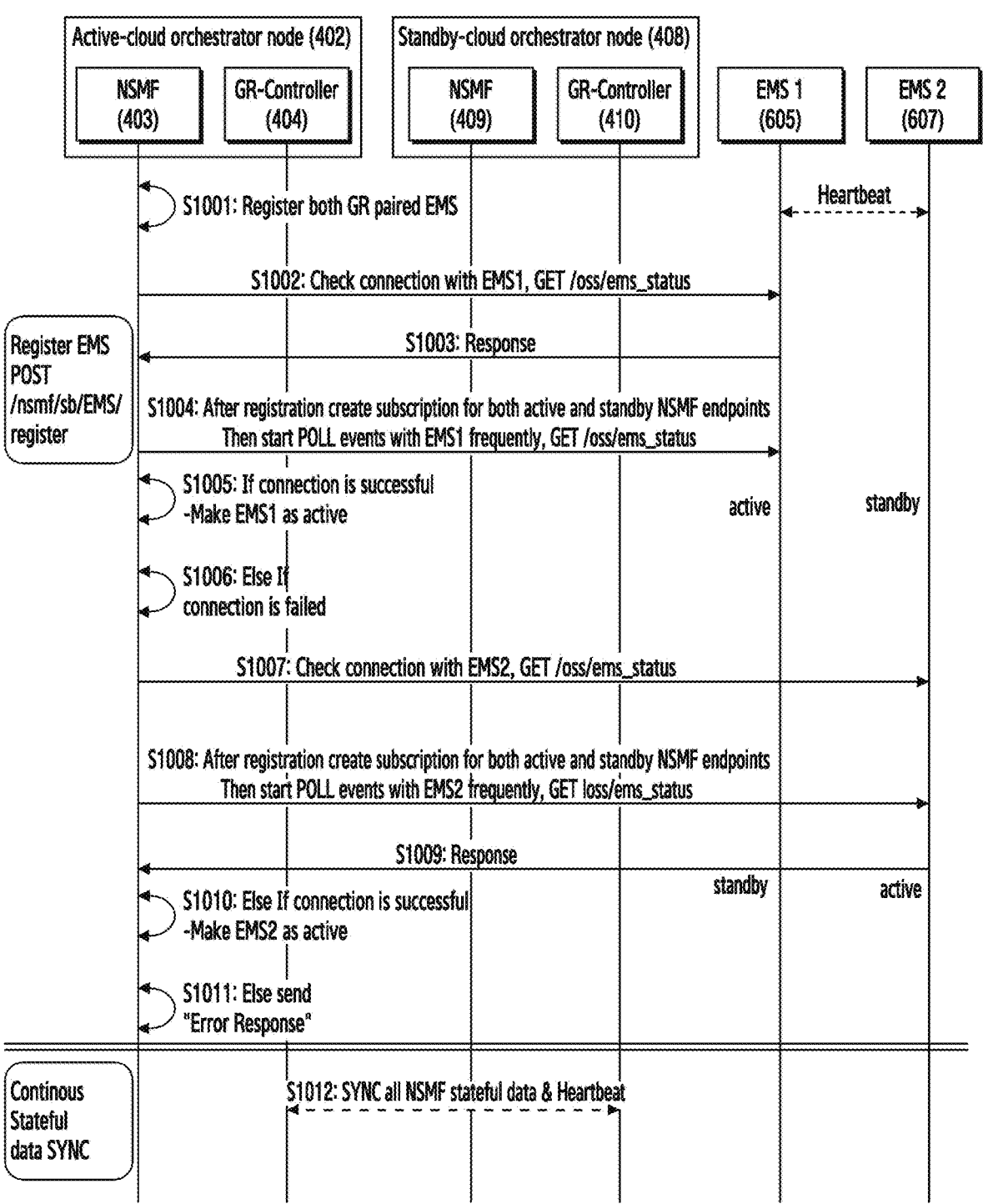
FIG. 10 is a sequence diagram that illustrates a NSMF and GR-EMS registration, according to an embodiment of the disclosure.

FIG. 10 is a sequence diagram that illustrates a NSMF and GR-EMS registration, according to an embodiment of the disclosure.

The active-cloud orchestrator node 402 includes NSMF 403 and GR-Controller 404. The Standby-cloud orchestrator node 408 includes NSMF 409 and GR-Controller 410. At operation S1001, the active-NSMF 403 of the active-cloud orchestrator node 402, initiates a registration request with both the active EMS 1 605 and standby EMS 2 607.

At operation S1002, the active-NSMF 403 sends a registration request message to the active EMS 1 605 to register the active-NSMF 403 with the active EMS 1 605 to get the EMS status.

At operation S1003, the active-NSMF 403 of the active-cloud orchestrator node receives a registration response message from the active EMS1 605 confirming registration of the active-NSMF 403 with the active EMS1 605.

At operation S1004, after successful registration, the active-NSMF 403 creates subscription for both active and standby NSMFs. Further, POLL events are started with the active EMS1 605 frequently to get the EMS status.

At operation S1005, when the connection is successful, then EMS1 605 is made active. For example, EMS1 605 may be active and EMS2 607 may be standby.

When the connection fails with EMS 1 605 at operation S1006, then at operation S1007, active-NSMF 403 of the active-cloud orchestrator node 402 sends a registration request message to the standby EMS 2 607 to register the active-NSMF 403 with the standby EMS 2 607 to get the EMS status.

At operation S1008, after successful registration, the active-NSMF 403 creates subscription for both active and standby NSMFs. The POLL events are started with the standby EMS2 607 frequently to get the EMS status.

At operation S1009, the active-NSMF 403 receives registration response message from the standby EMS 2 607 confirming registration of the active-NSMF 403 with the standby EMS 2 607.

At operation S1010, when the connection is successful, then EMS2 607 is made active. For example, EMS2 607 may be active and EMS1 605 may be standby.

When the connection fails with EMS 2 607 at operation S1011, an "Error message" is sent.

At operation S1012, the GR-controller 404 of active-cloud orchestrator node 402 syncs all NSMF stateful data with the GR-controller 410 of standby-cloud orchestrator node 408.

Figure 11:
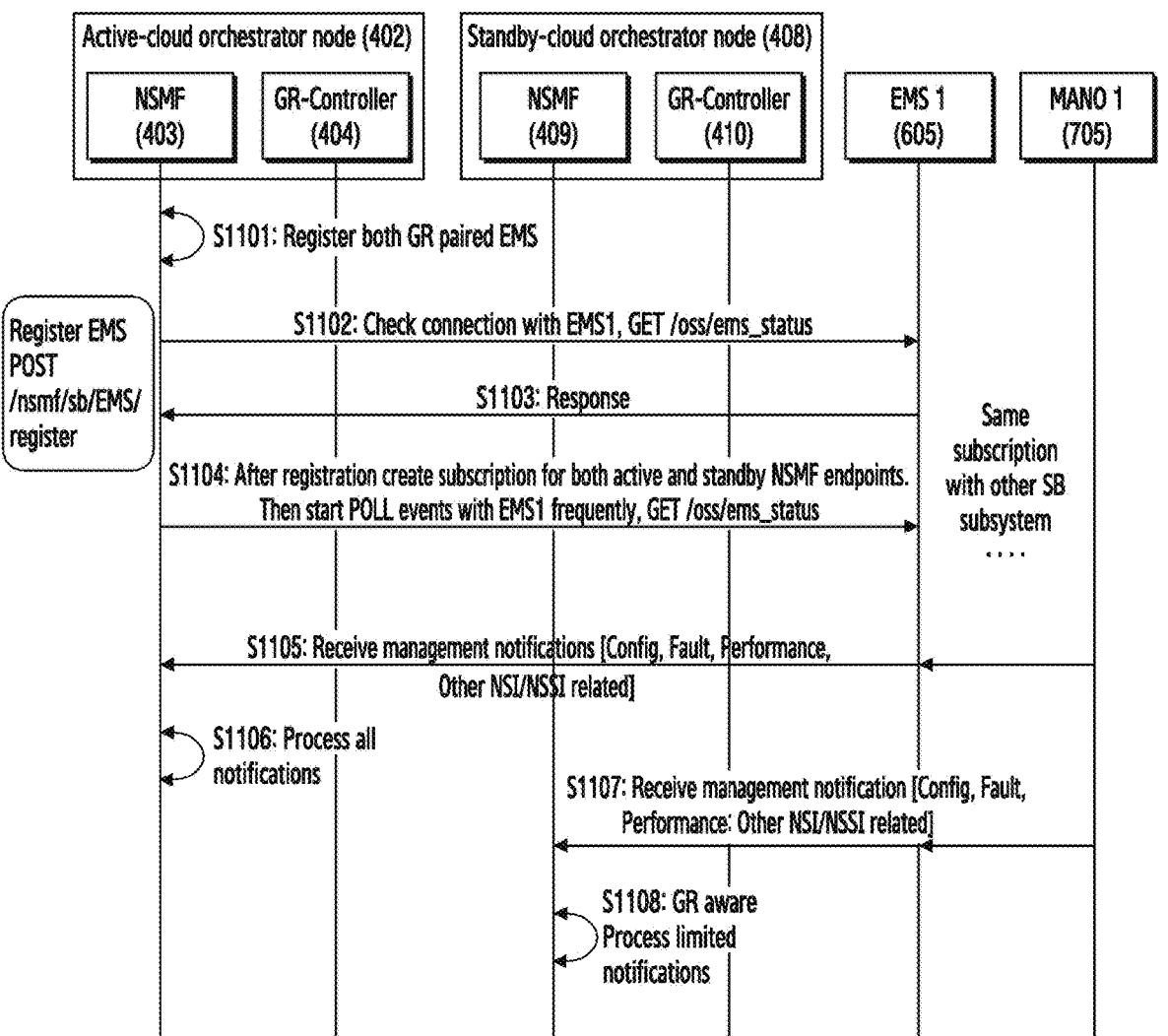
FIG. 11 is a sequence diagram that illustrates GR-aware NSMF with Publication/Subscription notification processing, according to an embodiment of the disclosure.

FIG. 11 is a sequence diagram that illustrates GR-aware NSMF with Publication/Subscription notification processing, according to an embodiment of the disclosure.

The active-cloud orchestrator node 402 includes NSMF 403 and GR-Controller 404. The Standby-cloud orchestrator node 408 includes NSMF 409 and GR-Controller 410. At operation S1101, the active-NSMF 403 of the active-cloud orchestrator node 402, initiates a registration request with both the active EMS 1 605 and standby EMS 2 607.

At operation S1102, the active-NSMF 403 of the active-cloud orchestrator node 402 sends a subscription or publication notification request message to the active EMS 1 605 to receive notification corresponding to specific events associated with the standby-cloud orchestrator node 408 to get the EMS status.

At operation S1103, the active-NSMF 403 receives a subscription or publication notification response message from the active EMS 1 605 confirming subscription for the notification corresponding to specific events associated with the standby-cloud orchestrator node 408.

At operation S1104, after successful registration, the active-NSMF 403 creates subscription for both active and standby NSMFs. The POLL events are started with the active EMS 1 605 frequently to get the EMS status. The active-NSMF 403 follows the same subscription with another SB subsystem.

At operation S1105, the active-NSMF 403 receives management notifications from Management and Network Orchestrator (MANO) 1 705. The notifications are related to config, fault, performance, other NSI/NSSI etc.

At operation S1106, the active-NSMF 403 processes all received notifications.

At operation S1107, the standby-NSMF 409 receives management notifications MANO 1 705. The notifications are related to config, fault, performance, other NSI/NSSI etc.

At operation S1108, the standby-NSMF 409 processes GR aware Process limited notifications.

Figure 12:
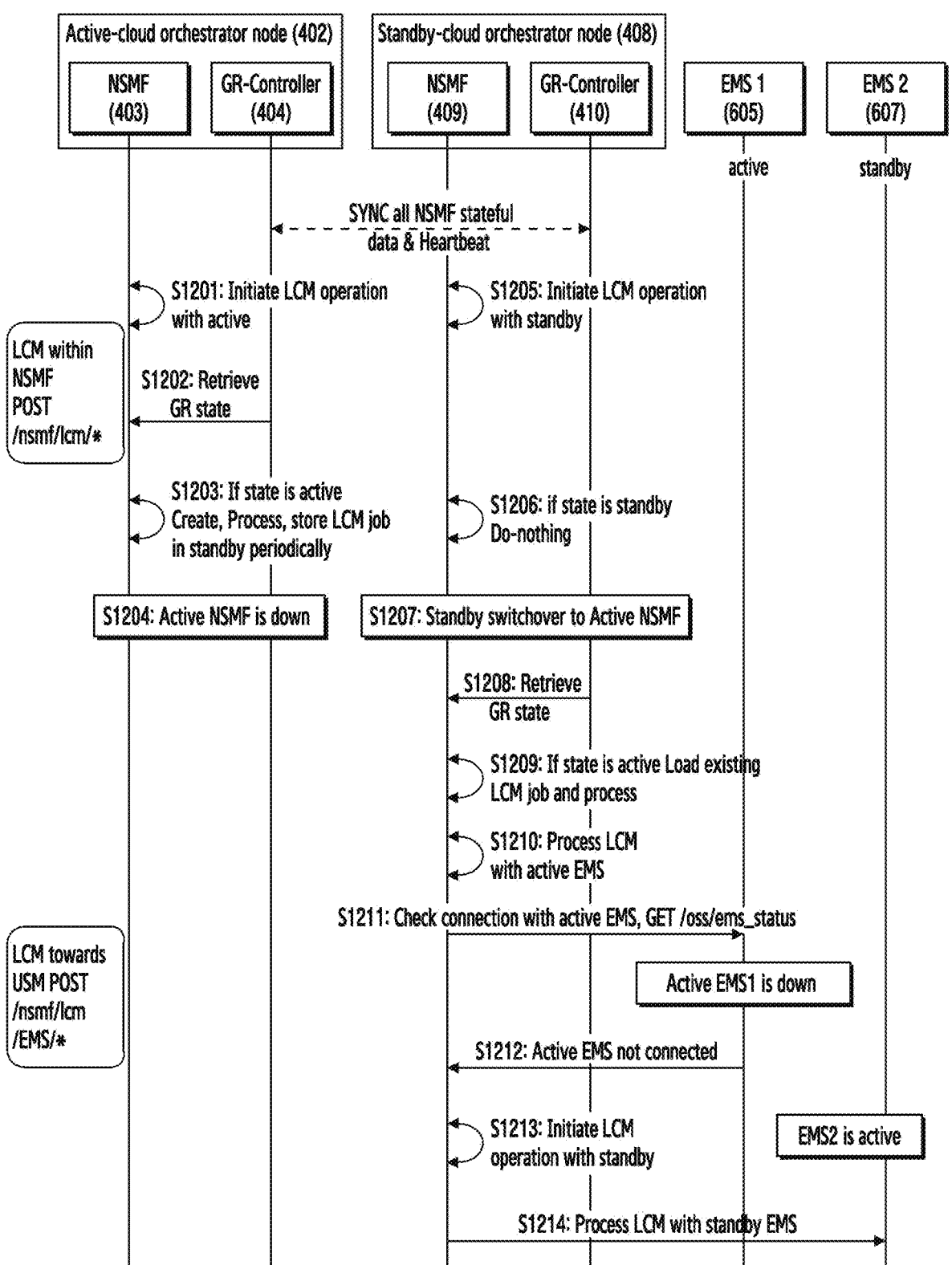
FIG. 12 is a sequence diagram that illustrates GR-aware NSMF LCM operation, according to an embodiment of the disclosure.

FIG. 12 is a sequence diagram that illustrates GR-aware NSMF LCM operation, according to an embodiment of the disclosure.

Referring to FIG. 12, the active-cloud orchestrator node 402 includes NSMF 403 and GR-Controller 404. The Standby-cloud orchestrator node 408 includes NSMF 409 and GR-Controller 410. The process initiates with the GR-controller 404 of active-cloud orchestrator node 402 syncing all NSMF stateful data with the GR-controller 410 of standby-cloud orchestrator node 408. At operation S1201, the active-NSMF 403 performs a Life Cycle Management (LCM) operation associated with at least one state of a plurality of states of the LCM operation with the active-NSMF 403. The LCM operation detects if the active-NSMF 403 is down.

At operation S1202, the GR-controller 404 of the active-cloud orchestrator node 402 retrieves the current state of the active-NSMF 403.

At operation S1203, if the retrieved state is active, the active-NSMF 403 creates processes and stores the LCM job in standby periodically.

At operation S1204, if the active-NSMF 403 is down, then at operation S1205, the standby-NSMF 409 of the standby-cloud orchestrator node 408 initiates the LCM operation associated with at least one state of a plurality of states of the LCM operation with the standby-NSMF 409.

At operation S1206, if the state is standby, then the standby-NSMF 409 does not perform the LCM operation for at least one of monitoring at least one of a NSI event and a NSSI event. For example, the standby-NSMF 409 may skip (or refrain from, cease, stop) performing the LCM operation for at least one of monitoring at least one of a NSI event and a NSSI event, subscribing for events and processing notification from at least one of an EMS, an NSI, a NSSI and NFs, and monitoring at least one of a NSI, a NSSI FM, and a PM.

At operation S1207, the standby-NSMF 409 is switched to the active-NSMF. For example, after the active-NSMF 403 perform creating processes and storing the LCM job at operation S1203 and the standby-NSMF 409 does not perform the LCM operation at operation S1206, the active-NSMF 403 may be down at operation S1204 and the standby-NSMF 409 may be switched to the new active-NSMF.

At operation S1208, the GR-controller 410 of the standby-cloud orchestrator node 408 retrieves the current state of the active-NSMF 409.

At operation S1209, if the state of the NSMF 409 is active, the active NSMF 409 loads existing LCM job and process.

At operation S1210, the active-NSMF 409 processes the LCM with the active EMS.

At operation S1211, the active-NSMF 409 sends a registration request message to the active EMS 1 605 to register the active-NSMF 409 with the active EMS 1 605.

At operation S1212, as the active EMS 1 605 is down, it is not considered for connection.

At operation S1213, the active-NSMF 409 initiates the LCM operation with the standby EMS 2 607.

At operation S1124, the active-NSMF 409 processes the LCM with the standby EMS 2 607.

In the GR-aware NSMF, if the active-cloud orchestrator node 402 is down the LCM job at standby-cloud orchestrator node 408 can be started from a specific finished stage.

Figure 13:
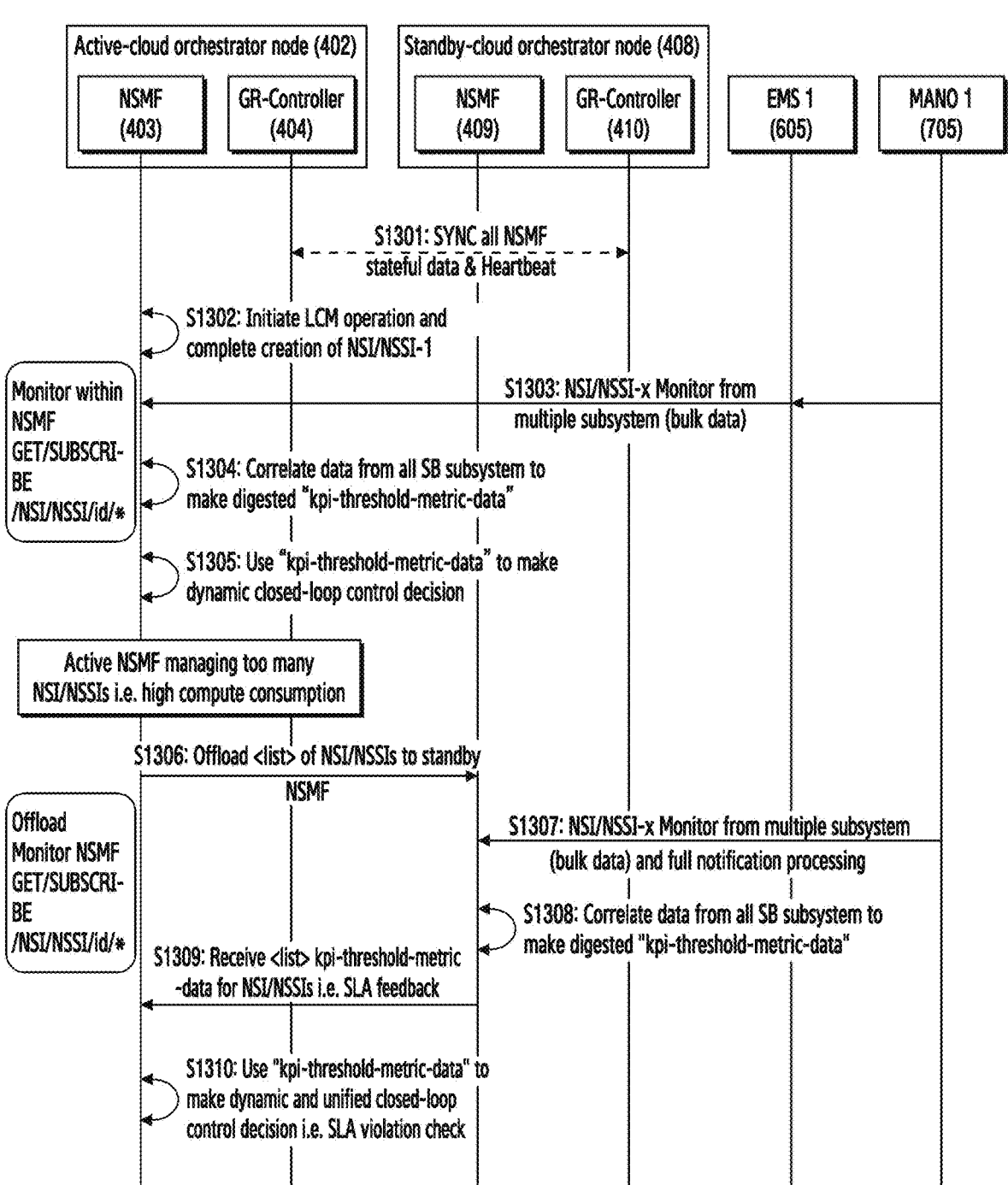
FIG. 13 is a sequence diagram that illustrates GR-aware NSMF monitoring for compute load sharing, according to an embodiment of the disclosure.

FIG. 13 is a sequence diagram that illustrates GR-aware NSMF monitoring for compute load sharing, according to an embodiment of the disclosure.

Referring to FIG. 13, the active-cloud orchestrator node 402 includes NSMF 403 and GR-controller 404. The Standby-cloud orchestrator node 408 includes NSMF 409 and GR-controller 410. At operation S1301, the process initiates with the GR-controller 404 of active-cloud orchestrator node 402 syncing all NSMF stateful data and the heartbeat with the GR-controller 410 of standby-cloud orchestrator node 408.

At operation S1302, the active-NSMF 403 initiates the LCM operation associated with monitoring at least one of a NSI, a NSSI FM, and a PM with the active-NSMF 403. The LCM operation detects if the active-NSMF 403 is down.

At operation S1303, the MANO 1 705 monitors NSI/NSSI-x from multiple SB subsystems.

At operation S1304, the active-NSMF 403 correlates data from all SB subsystems to create a digested metric data.

At operation S1305, the active-NSMF 403 uses the digested metric data to make dynamic closed-loop control decision. The active-NSMF 403 manages too many NSI/NSSIs i.e. high compute consumption.

At operation S1306, the active-NSMF 403 offloads the list of NSI/NSSIs from the digested metric data to the standby-NSMF 409 to perform the LCM operations based on the ideal resources at the standby-NSMF 409.

At operation S1307, the MANO 1 705 monitors NSI/NSSI-x from multiple SB subsystems and full notification processing.

At operation S1308, the standby-NSMF 403 correlates data from all SB subsystem to create a digested metric data.

At operation S1309, active-NSMF 403 receive the list of digested metric data for NSI/NSSIs (i.e. SLA feedback) from the standby-NSMF 409.

At operation S1310, the active-NSMF 403 uses the digested metric data to make dynamic and unified closed-loop control decision (i.e., SLA violation check).

The GR-aware NSMF helps active-cloud orchestrator node 402 and standby-cloud orchestrator node 408 to utilize each other's ideal compute resource by resource sharing. At the same time, making sure no impact on happens on the system performance.

Figure 14:
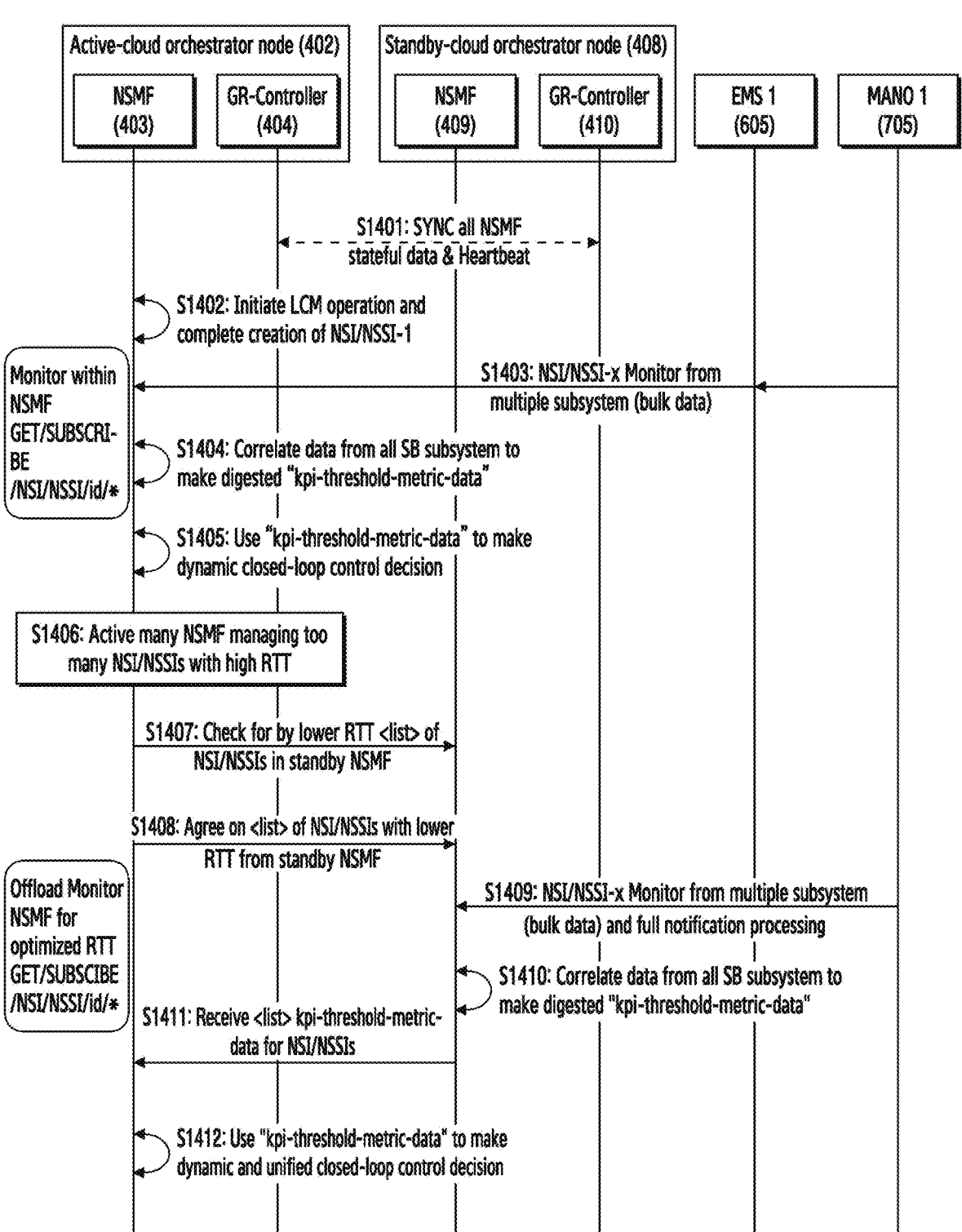
FIG. 14 is a sequence diagram that illustrates GR-aware NSMF monitoring for geographic load sharing, according to an embodiment of the disclosure.

FIG. 14 is a sequence diagram that illustrates GR-aware NSMF monitoring for geographic load sharing, according to an embodiment of the disclosure.

Referring to FIG. 14, the active-cloud orchestrator node 402 includes NSMF 403 and GR-controller 404. The Standby-cloud orchestrator node 408 includes NSMF 409 and GR-controller 410. At operation S1401, the process initiates with the GR-controller 404 of active-cloud orchestrator node 402 syncing all NSMF stateful data and the heartbeat with the GR-controller 410 of standby-cloud orchestrator node 408.

At operation S1402, the active-NSMF 403 initiates the LCM operation associated with monitoring at least one of a NSI, a NSSI FM, and a PM with the active-NSMF 403. The LCM operation detects if the active-NSMF 403 is down.

At operation S1403, the MANO 1 705 monitors NSI/NSSI-x from multiple SB subsystems.

At operation S1404, the active-NSMF 403 correlates data from all SB subsystems to create a digested metric data.

At operation S1405, the active-NSMF 403 uses the digested metric data to make dynamic closed-loop control decision.

At operation S1406, the active-NSMF 403 manages too many NSI/NSSIs i.e. high compute with high RTT.

At operation S1407, the active-NSMF 403 checks for lower RTT <list> of NSI/NSSIs in the standby-NSMF 409.

At operation S1408, the active-NSMF 403 agrees on <list> of NSI/NSSIs with lower RTT from the standby-NSMF 409.

At operation S1409, the MANO 1 705 monitors NSI/NSSI-x from multiple SB subsystems and full notification processing.

At operation S1410, the standby-NSMF 403 correlates data from all SB subsystems to create a digested metric data.

At operation S1411, the active-NSMF 403 receive the list of digested metric data for NSI/NSSIs (i.e. SLA feedback) from the standby-NSMF 403.

At operation S1412, the active-NSMF 403 uses the digested metric data to make dynamic and unified closed-loop control decision.

The GR-aware NSMF helps active-cloud orchestrator node 402 to offload some monitoring tasks to standby-cloud orchestrator node 408 that are physically close to itself.

Figure 15:
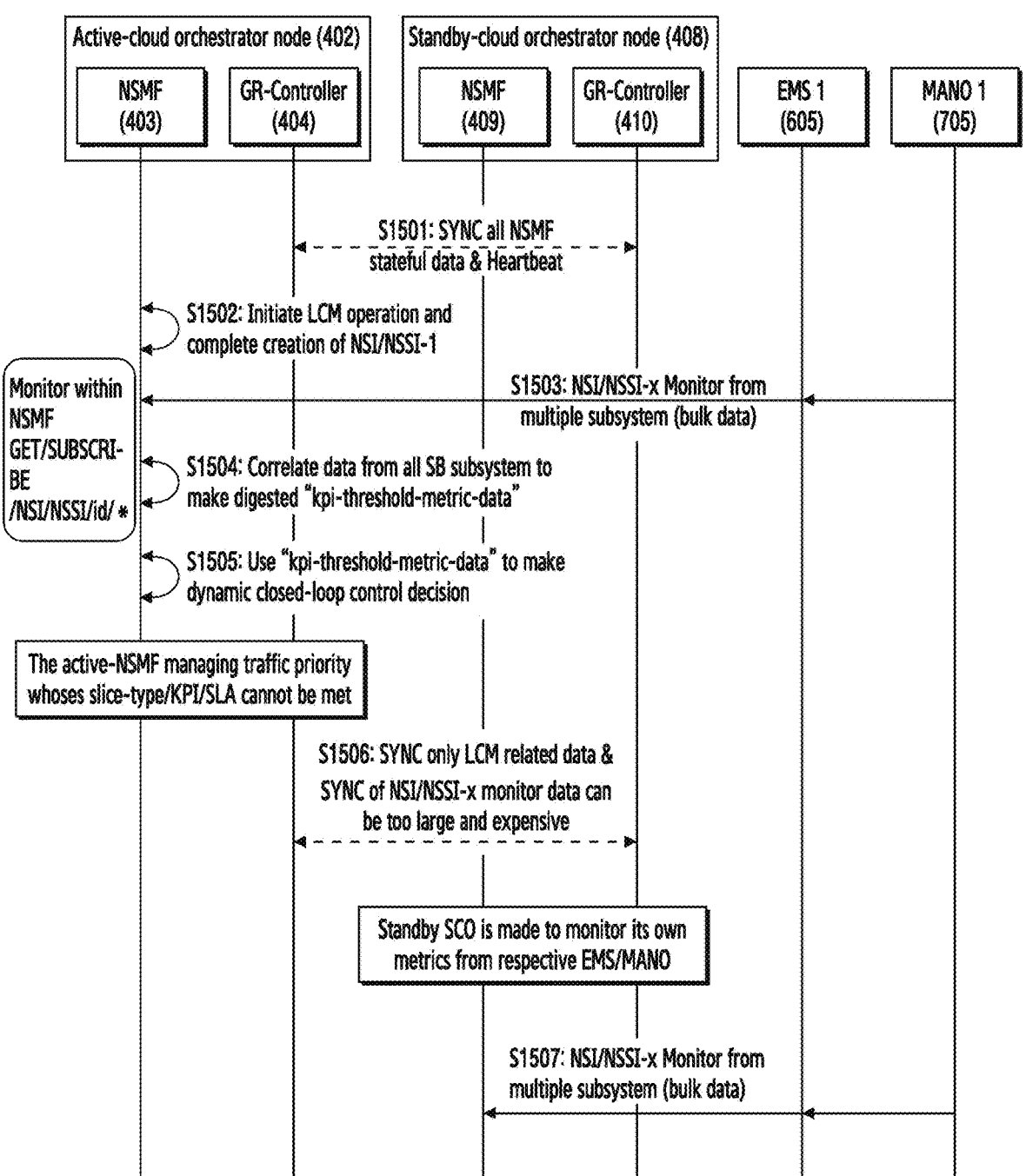
FIG. 15 is a sequence diagram that illustrates prioritized traffic optimization, according to an embodiment of the disclosure.

FIG. 15 is a sequence diagram that illustrates prioritized traffic optimization, according to an embodiment of the disclosure.

Referring to FIG. 15, the active-cloud orchestrator node 402 includes NSMF 403 and GR-controller 404. The standby-cloud orchestrator node 408 includes NSMF 409 and GR-controller 410. At operation S1501, the process initiates with the GR-controller 404 of the active-cloud orchestrator node 402 syncing all NSMF stateful data and the heartbeat with the GR-controller 410 of standby-cloud orchestrator node 408.

At operation S1502, the active-NSMF 403 initiates the LCM operation associated with monitoring at least one of a NSI, a NSSI FM, and a PM with the active-NSMF 403. The 1 cm operation detects if the active-NSMF 403 is down.

At operation S1503, the MANO 1 705 monitors NSI/NSSI-x from multiple SB subsystems.

At operation S1504, the active-NSMF 403 correlates data from all SB subsystems to create a digested metric data.

At operation S1505, the active-NSMF 403 uses the digested metric data to make dynamic closed-loop control decision. Further, the active-NSMF 403 manages traffic priority optimization to finalize which route is optimal.

At operation S1506, the GR-controller 404 of the active-cloud orchestrator node 402 syncs only LCM related data with the GR-controller 410 of standby-cloud orchestrator node 408 to avoid syncing of NSI/NSSI-x monitor data that can be too large and expensive.

The standby-cloud orchestrator node 408 is made to monitor its own metrics from respective EMS/MANO.

At operation S1507, the MANO 1 705 monitors NSI/NSSI-x from multiple SB subsystems.

The GR-aware NSMF makes it is possible to customize certain type of traffic on east-west and north-south. The east-west is syncing traffic between OP and DR NSMF and north-south is traffic between NSI/NSSI/NFs and NSMF. For instance, on standby-cloud orchestrator node 408 monitoring of NSS/NFs can be done directly from the SB-blocks instead of syncing from expensive east-west from active-cloud orchestrator node 402.

Figure 16:
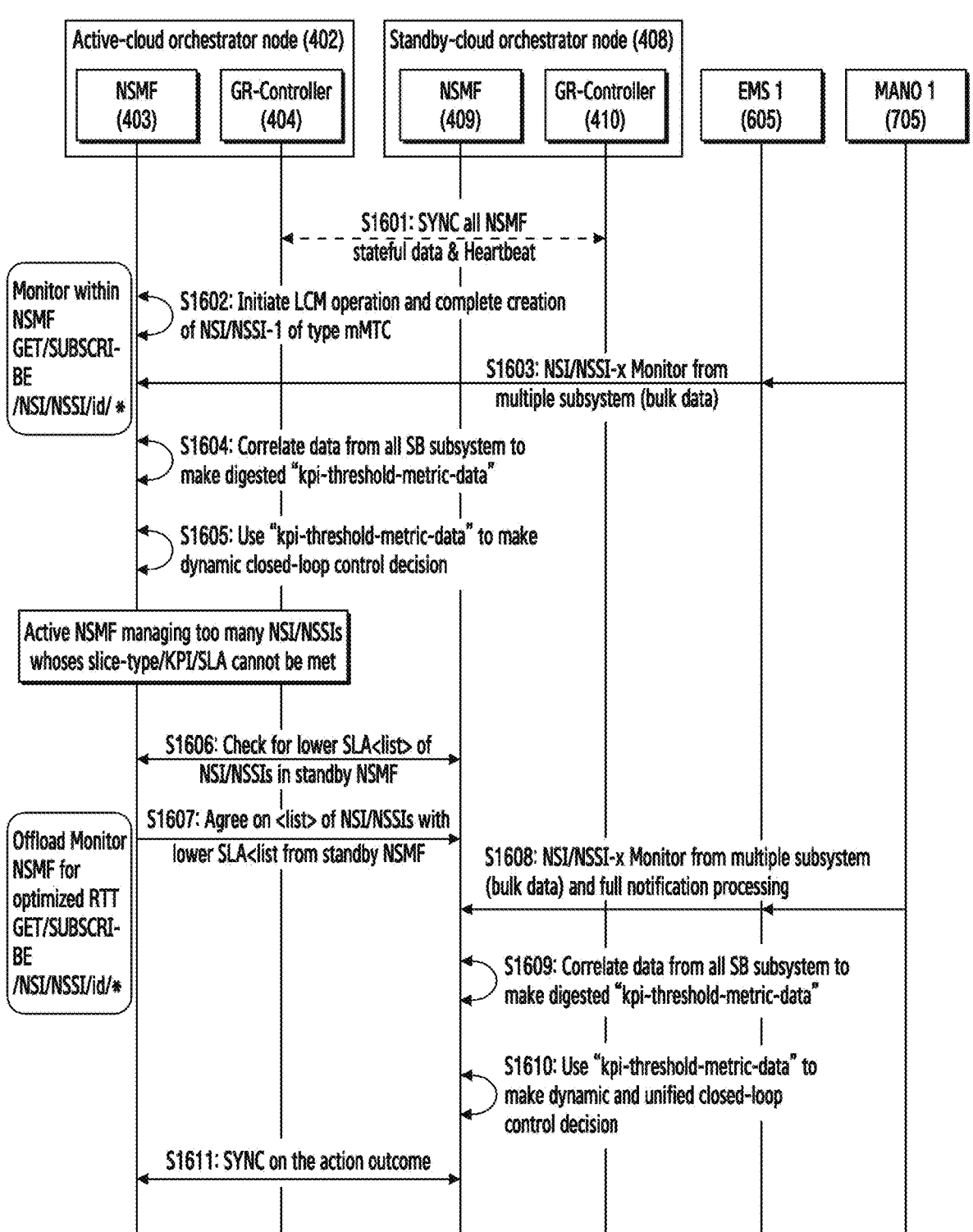
FIG. 16 is a sequence diagram that illustrates GR-aware NSMF sharing workload as per slice-type/service level agreement (SLA)/key performance indicator (KPI) of NSSI/ NSSI, according to an embodiment of the disclosure.

FIG. 16 is a sequence diagram that illustrates GR-aware NSMF sharing workload as per slice-type/SLA/KPI of NSI/NSSI, according to an embodiment of the disclosure.

Referring to FIG. 16, the active-cloud orchestrator node 402 includes NSMF 403 and GR-controller 404. The standby-cloud orchestrator node 408 includes NSMF 409 and GR-controller 410. At operation S1601, the process initiates with the GR-controller 404 of active-cloud orchestrator node 402 syncing all NSMF stateful data and the heartbeat with the GR-controller 410 of standby-cloud orchestrator node 408.

At operation S1602, the active-NSMF 403 initiates the LCM operation and complete creation of NSI/NSSI-1 of type mMTC.

At operation S1603, the MANO 1 705 monitors NSI/NSSI-x from multiple SB subsystems.

At operation S1604, the active-NSMF 403 correlates data from all SB subsystems to create a digested metric data.

At operation S1605, the active-NSMF 403 uses the digested metric data to make dynamic closed-loop control decision. The active-NSMF 403 manages too many NSI/NSSIs whose slice-type/KPI/SLA cannot be met.

At operation S1606, the active-NSMF 403 checks for lower SLA <list> of NSI/NSSIs in the standby-NSMF 409.

At operation S1607, the active-NSMF 403 agrees on <list> of NSI/NSSIs with lower SLA from the standby-NSMF 409.

At operation S1608, the MANO 1 705 monitors NSI/NSSI-x from multiple SB subsystems and full notification processing.

At operation S1609, the standby-NSMF 409 correlates data from all SB subsystems to create a digested metric data.

At operation S1610, the standby-NSMF 409 uses the digested metric data to make dynamic and unified closed-loop control decision.

At operation S1611, the active-NSMF 403 syncs on the action outcome with the standby-NSMF 409.

Figure 17:
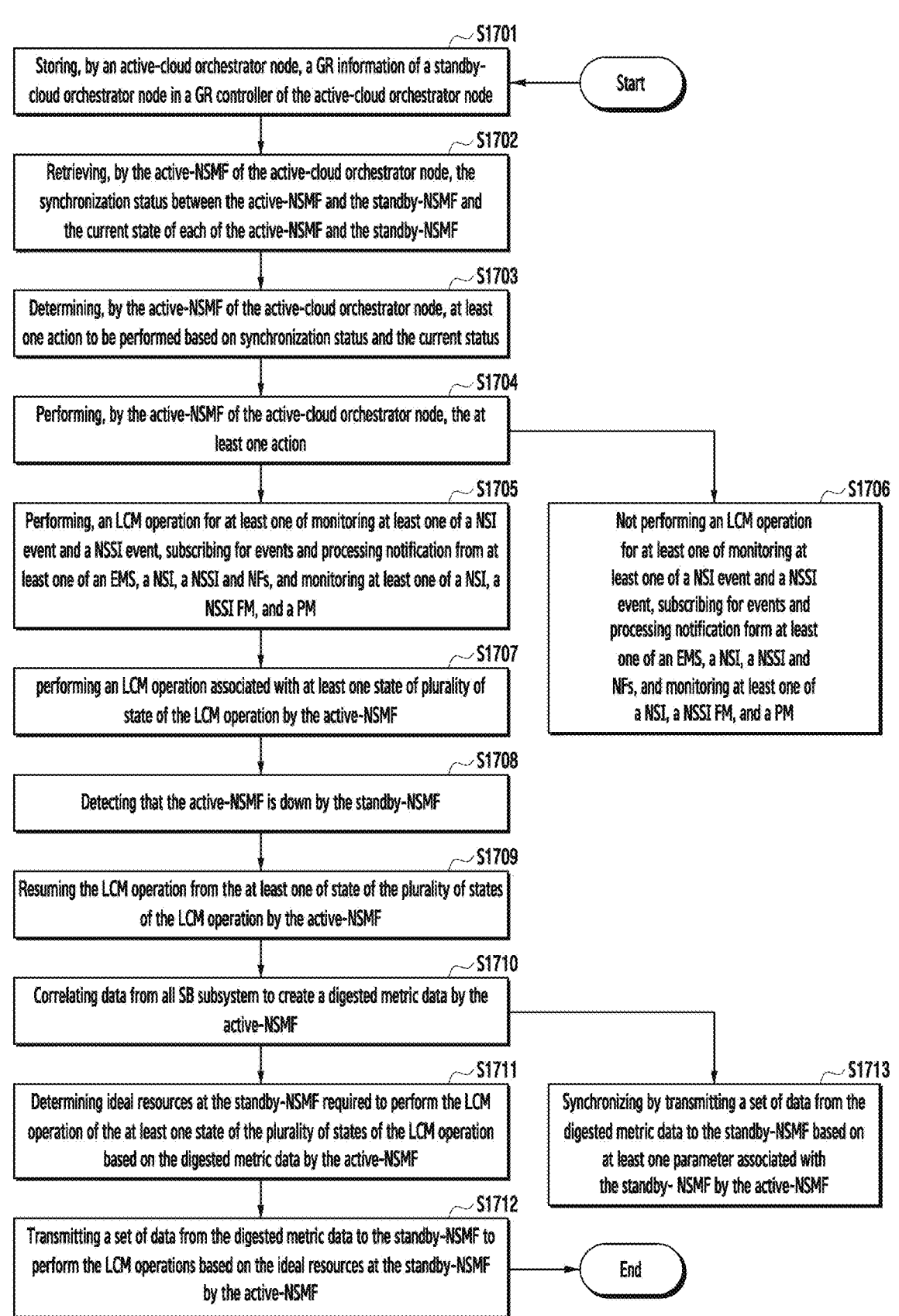
FIG. 17 is a flowchart that illustrates a GR-aware NSMF in a wireless network, according to an embodiment of the disclosure.

FIG. 17 is a flowchart that illustrates a GR-aware NSMF in a wireless network, according to an embodiment of the disclosure. The method includes GR-aware NSMF in a wireless network.

Referring to FIG. 17, at operation S1701, GR information of a standby-cloud orchestrator node is stored in a GR controller of the active-cloud orchestrator node by an active-cloud orchestrator node. The GR information comprises a synchronization status between an active-NSMF of the active-cloud orchestrator node and a standby-NSMF of the standby-cloud orchestrator node. The GR information also comprises a current state of each of the active-NSMF of the active-cloud orchestrator node and the standby-NSMF of the standby-cloud orchestrator node, and a current state an active EMS associated with the active-NSMF and a standby EMS associated with the standby-NSMF.

At operation S1702, by the active-NSMF of the active-cloud orchestrator node retrieves the synchronization status between the active-NSMF and the standby-NSMF and the current state of each of the active-NSMF and the standby-NSMF. The active-cloud orchestrator node is at a first location and the standby-cloud orchestrator node is at a second location.

At operation S1703, the active-NSMF of the active-cloud orchestrator node determines at least one action to be performed based on the synchronization status between the active-NSMF and the standby-NSMF, the current state of each of the active-NSMF and the standby-NSMF, and the current state the active EMS associated with the active-NSMF and the standby EMS associated with the standby-NSMF.

At operation S1704, the active-NSMF of the active-cloud orchestrator node performs the at least one action.

At operation S1705, an LCM operation is performed for at least one of monitoring at least one of a NSI event and a NSSI event, subscribing for events and processing notification from at least one of an EMS, an NSI, a NSSI and NFs, and monitoring at least one of a NSI, a NSSI FM, and a PM.

Otherwise, at operation S1706, an LCM operation is not performed for at least one of monitoring at least one of a NSI event and a NSSI event, subscribing for events and processing notification from at least one of an EMS, an NSI, a NSSI and NFs, and monitoring at least one of a NSI, a NSSI FM, and a PM. For example, the LCM operation may be skipped (or refrained from, ceased, stopped) performing for at least one of monitoring at least one of a NSI event and a NSSI event, subscribing for events and processing notification from at least one of an EMS, an NSI, a NSSI and NFs, and monitoring at least one of a NSI, a NSSI FM, and a PM.

At operation S1707, the active NSMF performs the LCM operation associated with at least one state of a plurality of states of the LCM operation.

At operation S1708, the standby NSMF detects that the active-NSMF is down by the standby-NSMF.

At operation S1709, the active-NSMF resumes the LCM operation from the at least one state of the plurality of states of the LCM operation.

Further at operation S1710, the active-NSMF correlates data from all SB subsystems to create a digested metric.

At operation S1711, the active-NSMF determines ideal resources at the standby-NSMF required to perform the LCM operation of the at least one state of the plurality of states of the LCM operation based on the digested metric data.

At operation S1712, the active NSMF transmits a set of data from the digested metric data to the standby-NSMF to perform the LCM operations based on the ideal resources at the standby-NSMF.

At operation S1713, the active NSMF synchronizes by transmitting a set of data from the digested metric data to the standby-NSMF based on at least one parameter associated with the standby-.

In an embodiment, the GR controller of the active-cloud orchestrator node sends a data synchronization request message to receive the GR information from a GR controller of the standby-cloud orchestrator node. In response, it receives a data synchronization response message comprising the GR information from the GR controller of the standby-cloud orchestrator node.

In an embodiment, the active-NSMF of the active-cloud orchestrator node sends a GR information request message to receive the GR information from the GR controller of the active-cloud orchestrator node. In response, the active-NSMF receives a GR information response message comprising the GR information from the GR controller of the active-cloud orchestrator node.

In an embodiment, the active-NSMF of the active-cloud orchestrator node sends a registration request message to the active EMS to register the active-NSMF with the active EMS. In response, the active-NSMF receives a registration response message from the active EMS confirming registration of the active-NSMF with the active EMS.

In an embodiment, the active-NSMF of the active-cloud orchestrator node sends a registration request message to the standby EMS to register the active-NSMF with the standby EMS. In response, the active-NSMF receives a registration response message from the standby EMS confirming registration of the active-NSMF with the standby EMS.

In an embodiment, the active-NSMF of the active-cloud orchestrator node sends a subscription or publication notification request message to the active EMS to receive notification corresponding to specific events associated with the standby-cloud orchestrator node. In response, the active-NSMF receives a subscription or publication notification response message from the active EMS confirming subscription for the notification corresponding to specific events associated with the standby-cloud orchestrator node.

In an embodiment, the active-NSMF of the active-cloud orchestrator node sends a subscription or publication notification request message to the standby EMS to receive notification corresponding to specific events associated with the standby-cloud orchestrator node. In response, the active-NSMF receives a subscription or publication notification response message from the standby EMS confirming subscription for the notification corresponding to specific events associated with the standby-cloud orchestrator node.

According to embodiments, a method for geo redundancy (GR) aware network slice management function (NSMF) in a wireless network system, may comprise storing, by an active-cloud orchestrator node, a GR information of a standby-cloud orchestrator node in a GR controller of the active-cloud orchestrator node. The method may comprise retrieving, by the active-cloud orchestrator node, a synchronization status between an active-NSMF and a standby-NSMF and a current state of each of the active-NSMF and the standby-NSMF, wherein the active-cloud orchestrator node is at a first location and the standby-cloud orchestrator node is at a second location. The method may comprise determining, by the active-cloud orchestrator node, at least one action to be performed based on the synchronization status between the active-NSMF and the standby-NSMF, the current state of each of the active-NSMF and the standby-NSMF, and the current state of an active element management system (EMS) associated with the active-NSMF and a standby EMS associated with the standby-NSMF. The method may comprise performing, by the active-cloud orchestrator node, the at least one action.

In an embodiment, wherein the GR information may comprise the synchronization status between the active-NSMF of the active-cloud orchestrator node and the standby-NSMF of the standby-cloud orchestrator node, the current state of each of the active-NSMF of the active-cloud orchestrator node and the standby-NSMF of the standby-cloud orchestrator node, and the current state of an active Element Management System (EMS) associated with the active-NSMF and a standby EMS associated with the standby-NSMF In an embodiment, the storing, by the active-cloud orchestrator node, of the GR information of the standby-cloud orchestrator node in the GR controller of the standby-cloud orchestrator node may comprise sending, by the GR controller of the active-cloud orchestrator node, a data synchronization request message to receive the GR information from a GR controller of the standby-cloud orchestrator node. The storing, by the active-cloud orchestrator node, of the GR information of the standby-cloud orchestrator node in the GR controller of the standby-cloud orchestrator node may comprise receiving, by the GR controller of the active-cloud orchestrator node, a data synchronization response message comprising the GR information from the GR controller of the standby-cloud orchestrator node. The storing, by the active-cloud orchestrator node, of the GR information of the standby-cloud orchestrator node in the GR controller of the standby-cloud orchestrator node may comprise storing, by the active-cloud orchestrator node, the GR information of the standby-cloud orchestrator node in the GR controller of the active-cloud orchestrator node.

In an embodiment, the retrieving, by the active-NSMF of the active-cloud orchestrator node, of the synchronization status between the active-NSMF and the standby-NSMF and the current state of each of the active-NSMF and the standby-NSMF may comprise sending, by the active-NSMF of the active-cloud orchestrator node, a GR information request message to receive the GR information from the GR controller of the active-cloud orchestrator node. The retrieving, by the active-NSMF of the active-cloud orchestrator node, of the synchronization status between the active-NSMF and the standby-NSMF and the current state of each of the active-NSMF and the standby-NSMF may comprise receiving, by the active-NSMF of the active-cloud orchestrator node, a GR information response message comprising the GR information from the GR controller of the active-cloud orchestrator node.

In an embodiment, the performing, by the active-NSMF of the active-cloud orchestrator node, of the at least one action may comprise at least one of performing a life cycle management (LCM) operation for at least one of monitoring at least one of a network slice instance (NSI) event and a network slice subnet instance (NSSI) event, subscribing for events and processing notification from at least one of an EMS, an NSI, an NSSI and network functions (NFs), and monitoring at least one of an NSI, an NSSI fault management (FM), and a performance management (PM) and not performing an LCM operation for at least one of monitoring at least one of a NSI event and a NSSI event, subscribing for events and notification from at least one of an EMS, an NSI, an NSSI and NFs, and monitoring at least one of a NSI, a NSSI FM, and a PM.

In an embodiment, the method may further comprise sending, by the active-NSMF of the active-cloud orchestrator node, a registration request message to the active EMS to register the active-NSMF with the active EMS. The method may further comprise receiving, by the active-NSMF of the active-cloud orchestrator node, a registration response message from the active EMS confirming registration of the active-NSMF with the active EMS.

In an embodiment, the method may further comprise sending, by the active-NSMF of the active-cloud orchestrator node, a registration request message to the standby EMS to register the active-NSMF with the standby EMS. The method may further comprise receiving, by the active-NSMF of the active-cloud orchestrator node, a registration response message from the standby EMS confirming registration of the active-NSMF with the standby EMS.

In an embodiment, the method may further comprise sending, by the active-NSMF of the active-cloud orchestrator node, a subscription or publication notification request message to the active EMS to receive notification corresponding to specific events associated with the standby-cloud orchestrator node. The method may further comprise receiving, by the active-NSMF of the active-cloud orchestrator node, a subscription or publication notification response message from the active EMS confirming subscription for the notification corresponding to specific events associated with the standby-cloud orchestrator node.

In an embodiment, the method may further comprise sending, by the active-NSMF of the active-cloud orchestrator node, a subscription or publication notification request message to the standby EMS to receive notification corresponding to specific events associated with the standby-cloud orchestrator node. The method may further comprise receiving, by the active-NSMF of the active-cloud orchestrator node, a subscription or publication notification response message from the standby EMS confirming subscription for the notification corresponding to specific events associated with the standby-cloud orchestrator node.

In an embodiment, the performing of the LCM operation may comprise performing, by the active-NSMF, the LCM operation associated with at least one state of a plurality of states of the LCM operation. The performing of the LCM operation may comprise detecting, by the standby-NSMF, that the active-NSMF is down. The performing of the LCM operation may comprise resuming, by the active-NSMF, the LCM operation from the at least one state of the plurality of states of the LCM operation.

In an embodiment, the method may comprise correlating, by the active-NSMF, data from all SB subsystem to create a digested metric data. The method may comprise determining, by the active-NSMF, ideal resources at the standby-NSMF required to perform the LCM operation of the at least one state of the plurality of states of the LCM operation based on the digested metric data. The method may comprise transmitting, by the active-NSMF, a set of data from the digested metric data to the standby-NSMF to perform the LCM operations based on the ideal resources at the standby-NSMF.

In an embodiment, the method may comprise correlating, by the active-NSMF, data from all SB subsystem to create a digested metric data. The method may comprise synchronizing, by the active-NSMF, by transmitting a set of data from the digested metric data to the standby-NSMF based on at least one parameter associated with the standby-NSMF.

According to embodiments, a wireless network system for geo redundancy (GR) aware network slice management function (NSMF), may comprise an active-cloud orchestrator node comprising an active-NSMF and a GR controller. The wireless network system may comprise a standby-cloud orchestrator node comprising a standby-NSMF and a GR controller. The GR controller of the active-cloud orchestrator node may include memory storing one or more computer programs and one or more processors communicatively coupled to the memory. The one or more computer programs may include executable instructions that, when executed by the one or more processors, cause the GR controller to store GR information of a standby-cloud orchestrator node in a GR controller of the active-cloud orchestrator node by an active-cloud orchestrator node. The one or more computer programs may include executable instructions that, when executed by the one or more processors, cause the GR controller to retrieve a synchronization status between the active-NSMF and the standby-NSMF and a current state of each of the active-NSMF and the standby-NSMF by the active-cloud orchestrator node, wherein the active-cloud orchestrator node is at a first location and the standby-cloud orchestrator node is at a second location. The one or more computer programs may include executable instructions that, when executed by the one or more processors, cause the GR controller to determine at least one action to be performed based on the synchronization status between the active-NSMF and the standby-NSMF, the current state of each of the active-NSMF and the standby-NSMF, and the current state of an active element management system (EMS) associated with the active-NSMF and a standby EMS associated with the standby-NSMF by the active-cloud orchestrator node. The one or more computer programs may include executable instructions that, when executed by the one or more processors, cause the GR controller to perform the at least one action by the active-cloud orchestrator node.

In an embodiment, the GR information may comprise the synchronization status between the active-NSMF of the active-cloud orchestrator node and the standby-NSMF of the standby-cloud orchestrator node, the current state of each of the active-NSMF of the active-cloud orchestrator node and the standby-NSMF of the standby-cloud orchestrator node, and the current state of an active EMS associated with the active-NSMF and a standby EMS associated with the standby-NSMF.

In an embodiment, the storing, by the active-cloud orchestrator node, of the GR information of the standby-cloud orchestrator node in the GR controller of the standby-cloud orchestrator node may comprise sending, by the GR controller of the active-cloud orchestrator node, a data synchronization request message to receive the GR information from a GR controller of the standby-cloud orchestrator node. The storing, by the active-cloud orchestrator node, of the GR information of the standby-cloud orchestrator node in the GR controller of the standby-cloud orchestrator node may comprise receiving, by the GR controller of the active-cloud orchestrator node, a data synchronization response message comprising the GR information from the GR controller of the standby-cloud orchestrator node. The storing, by the active-cloud orchestrator node, of the GR information of the standby-cloud orchestrator node in the GR controller of the standby-cloud orchestrator node may comprise storing, by the active-cloud orchestrator node, the GR information of the standby-cloud orchestrator node in the GR controller of the active-cloud orchestrator node.

In an embodiment, the retrieving, by the active-NSMF of the active-cloud orchestrator node, of the synchronization status between the active-NSMF and the standby-NSMF and the current state of each of the active-NSMF and the standby-NSMF may comprise sending, by the active-NSMF of the active-cloud orchestrator node, a GR information request message to receive the GR information from the GR controller of the active-cloud orchestrator node. The retrieving, by the active-NSMF of the active-cloud orchestrator node, of the synchronization status between the active-NSMF and the standby-NSMF and the current state of each of the active-NSMF and the standby-NSMF may comprise receiving, by the active-NSMF of the active-cloud orchestrator node, a GR information response message comprising the GR information from the GR controller of the active-cloud orchestrator node.

In an embodiment, the performing, by the active-NSMF of the active-cloud orchestrator node, of the at least one action may comprise at least one of performing a life cycle management (LCM) operation for at least one of monitoring at least one of a network slice instance (NSI) event and a network slice subnet instance (NSSI) event, subscribing for events and processing notification from at least one of an EMS, an NSI, an NSSI and network functions (NFs), and monitoring at least one of an NSI, an NSSI fault management (FM), and a performance management (PM) and not performing an LCM operation for at least one of monitoring at least one of a NSI event and a NSSI event, subscribing for events and notification from at least one of an EMS, an NSI, an NSSI and NFs, and monitoring at least one of a NSI, a NSSI FM, and a PM.

In an embodiment, the one or more computer programs may further include computer-executable instructions that, when executed by the one or more processors, cause the GR controller to send, by the active-NSMF of the active-cloud orchestrator node, a registration request message to the active EMS to register the active-NSMF with the active EMS. The one or more computer programs may further include computer-executable instructions that, when executed by the one or more processors, cause the GR controller to receive, by the active-NSMF of the active-cloud orchestrator node, a registration response message from the active EMS confirming registration of the active-NSMF with the active EMS.

In an embodiment, the one or more computer programs may further include computer-executable instructions that, when executed by the one or more processors, cause the GR controller to send, by the active-NSMF of the active-cloud orchestrator node, a registration request message to the standby EMS to register the active-NSMF with the standby EMS. The one or more computer programs may further include computer-executable instructions that, when executed by the one or more processors, cause the GR controller to receive, by the active-NSMF of the active-cloud orchestrator node, a registration response message from the standby EMS confirming registration of the active-NSMF with the standby EMS.

In an embodiment, the one or more computer programs may further include computer-executable instructions that, when executed by the one or more processors, cause the GR controller to send, by the active-NSMF of the active-cloud orchestrator node, a subscription or publication notification request message to the active EMS to receive notification corresponding to specific events associated with the standby-cloud orchestrator node. The one or more computer programs may further include computer-executable instructions that, when executed by the one or more processors, cause the GR controller to receive, by the active-NSMF of the active-cloud orchestrator node, a subscription or publication notification response message from the active EMS confirming subscription for the notification corresponding to specific events associated with the standby-cloud orchestrator node.

In an embodiment, the one or more computer programs may further include computer-executable instructions that, when executed by the one or more processors, cause the GR controller to send, by the active-NSMF of the active-cloud orchestrator node, a subscription or publication notification request message to the standby EMS to receive notification corresponding to specific events associated with the standby-cloud orchestrator node. The one or more computer programs may further include computer-executable instructions that, when executed by the one or more processors, cause the GR controller to receive, by the active-NSMF of the active-cloud orchestrator node, a subscription or publication notification response message from the standby EMS confirming subscription for the notification corresponding to specific events associated with the standby-cloud orchestrator node.

In an embodiment, the performing of the LCM operation may comprise performing, by the active-NSMF, the LCM operation associated with at least one state of a plurality of states of the LCM operation. The performing of the LCM operation may comprise detecting, by the standby-NSMF, that the active-NSMF is down. The performing of the LCM operation may comprise resuming, by the active-NSMF, the LCM operation from the at least one state of the plurality of states of the LCM operation.

In an embodiment, the one or more computer programs may further include computer-executable instructions that, when executed by the one or more processors, cause the GR controller to correlate, by the active-NSMF, data from all SB subsystem to create a digested metric data. The one or more computer programs may further include computer-executable instructions that, when executed by the one or more processors, cause the GR controller to determine, by the active-NSMF, ideal resources at the standby-NSMF required to perform the LCM operation of the at least one state of the plurality of states of the LCM operation based on the digested metric data. The one or more computer programs may further include computer-executable instructions that, when executed by the one or more processors, cause the GR controller to transmit, by the active-NSMF, a set of data from the digested metric data to the standby-NSMF to perform the LCM operations based on the ideal resources at the standby-NSMF.

In an embodiment, the one or more computer programs may further include computer-executable instructions that, when executed by the one or more processors, cause the GR controller to correlate, by the active-NSMF, data from all SB subsystem to create a digested metric data. The one or more computer programs may further include computer-executable instructions that, when executed by the one or more processors, cause the GR controller to synchronize, by the active-NSMF, by transmitting a set of data from the digested metric data to the standby-NSMF based on at least one parameter associated with the standby-NSMF.

In an embodiment, each of the active-NSMF and the standby-NSMF include a north bound interface (NBI) and a south bound interface (SBI) configured to manage traffic between the NSMF and a network slice instance (NSI), network slice subnet instance (NSSI), and network functions (NF).

In an embodiment, the wireless network system may further comprise a management and network orchestrator (MANO) configured to provide the active-NSMF with notifications related to NSI, NSSI, and NF.

According to embodiments, one or more non-transitory computer-readable storage media storing one or more computer programs including computer-executable instructions that, when executed by one or more processors of an electronic device, cause the electronic device to perform operations, the operations may comprise storing, by an active-cloud orchestrator node, geo redundancy (GR) information of a standby-cloud orchestrator node in a GR controller of the active-cloud orchestrator node. The operations may comprise retrieving, by the active-cloud orchestrator node, a synchronization status between an active-network slice management function (NSMF) and a standby-NSMF and a current state of each of the active-NSMF and the standby-NSMF, wherein the active-cloud orchestrator node is at a first location and the standby-cloud orchestrator node is at a second location. The operations may comprise determining, by the active-cloud orchestrator node, at least one action to be performed based on the synchronization status between the active-NSMF and the standby-NSMF, the current state of each of the active-NSMF and the standby-NSMF, and the current state of an active element management system (EMS) associated with the active-NSMF and a standby EMS associated with the standby-NSMF. The operations may comprise performing, by the active-cloud orchestrator node, the at least one action.

In an embodiment, the operations may further comprise sending, by the active-NSMF of the active-cloud orchestrator node, a registration request message to the active EMS to register the active-NSMF with the active EMS. The operations may comprise receiving, by the active-NSMF of the active-cloud orchestrator node, a registration response message from the active EMS confirming registration of the active-NSMF with the active EMS.

According to embodiments, a method performed by an active-network slice management function (NSMF) of an active-cloud orchestrator node for geo redundancy (GR) awareness, may comprise sending, to a GR controller of the active-cloud orchestrator node, a GR information request message to receive GR information. The method may comprise receiving, from the GR controller of the active-cloud orchestrator node, a GR information response message comprising the GR information including a synchronization status between the active-NSMF and a standby-NSMF of a standby-cloud orchestrator node and a current state of each of the active-NSMF and the standby-NSMF. The standby-cloud orchestrator node may be located at a location different from a location where the active-cloud orchestrator node is located. The method may comprise determining at least one action to be performed based on the GR information. The method may comprise performing the at least one action for life cycle management (LCM) operation.

In an embodiment, the GR information may further comprise a current state of an active Element Management System (EMS) associated with the active-NSMF and a standby EMS associated with the standby-NSMF.

In an embodiment, the GR information of the GR information of the standby-cloud orchestrator node may be stored in the GR controller of the standby-cloud orchestrator node by sending, from the GR controller of the active-cloud orchestrator node to the GR controller of the standby-cloud orchestrator node, a data synchronization request message and by receiving, by the GR controller of the active-cloud orchestrator node, a data synchronization response message comprising the GR information from the GR controller of the standby-cloud orchestrator node In an embodiment, the performing, by the active-NSMF of the active-cloud orchestrator node, of the at least one action may comprise performing the LCM operation for at least one of monitoring at least one of a network slice instance (NSI) event and a network slice subnet instance (NSSI) event, subscribing for events and processing notification from at least one of an EMS, an NSI, an NSSI and network functions (NFs), and monitoring at least one of an NSI, an NSSI fault management (FM), and a performance management (PM) in case that the synchronization status is normal and the current state of the active-NSMF is active, the synchronization status is abnormal and the current state of the active-NSMF is active, the synchronization status is unknown and the current state of the active-NSMF is active, or the synchronization status is unknown and the current state of the active-NSMF is standby.

In an embodiment, the performing, by the active-NSMF of the active-cloud orchestrator node, of the at least one action may comprise skipping the LCM operation for at least one of monitoring at least one of a NSI event and a NSSI event, subscribing for events and notification from at least one of an EMS, an NSI, an NSSI and NFs, and monitoring at least one of a NSI, a NSSI FM, and a PM in case that the synchronization status is normal and the current state of the active-NSMF is standby, or the synchronization status is abnormal and the current state of the active-NSMF is standby.

In an embodiment, the method may comprise sending, to an active EMS, a registration request message to register the active-NSMF with the active EMS. The method may comprise receiving, from the active EMS, a registration response message confirming registration of the active-NSMF with the active EMS.

In an embodiment, the method may comprise sending, to a standby EMS, a registration request message to register the active-NSMF with the standby EMS. The method may comprise receiving, from the standby EMS, a registration response message confirming registration of the active-NSMF with the standby EMS.

In an embodiment, the method may comprise sending, to an active EMS, a subscription or publication notification request message to receive notification corresponding to specific events associated with the standby-cloud orchestrator node. The method may comprise receiving, from the active EMS, a subscription or publication notification response message confirming subscription for the notification corresponding to specific events associated with the standby-cloud orchestrator node.

In an embodiment, the method may comprise sending, to a standby EMS, a subscription or publication notification request message to receive notification corresponding to specific events associated with the standby-cloud orchestrator node. The method may comprise receiving, from the standby EMS, a subscription or publication notification response message confirming subscription for the notification corresponding to specific events associated with the standby-cloud orchestrator node.

In an embodiment, the standby-NSMF of the standby-cloud orchestrator node may be switched to a new active-NSMF if the active NSMF of the active-cloud orchestrator node is down.

In an embodiment, the method may comprise correlating data from all SB subsystem to create a digested metric data. The method may comprise determining ideal resources at the standby-NSMF required to perform the LCM operation of the at least one state of the plurality of states of the LCM operation based on the digested metric data. The method may comprise transmitting a set of data from the digested metric data to the standby-NSMF to perform the LCM operations based on the ideal resources at the standby-NSMF.

In an embodiment, the method may comprise correlating data from all SB subsystem to create a digested metric data. The method may comprise synchronizing by transmitting a set of data from the digested metric data to the standby-NSMF based on at least one parameter associated with the standby-NSMF.

In an embodiment, each of the active-NSMF and the standby-NSMF may include a north bound interface (NBI) and a south bound interface (SBI) configured to manage traffic between the NSMF and a network slice instance (NSI), network slice subnet instance (NSSI), and network functions (NF).

According to embodiments, an active-network slice management function (NSMF) of an active-cloud orchestrator node for geo redundancy (GR) awareness, may comprise memory storing instructions. The active-NSMF may comprise at least one processor. The instructions, when executed by the at least one processor individually or collectively, may cause the active-NSMF to send, to a GR controller of the active-cloud orchestrator node, a GR information request message to receive GR information. The instructions, when executed by the at least one processor individually or collectively, may cause the active-NSMF to receive, from the GR controller of the active-cloud orchestrator node, a GR information response message comprising the GR information including a synchronization status between the active-NSMF and a standby-NSMF of a standby-cloud orchestrator node and a current state of each of the active-NSMF and the standby-NSMF. The standby-cloud orchestrator node may be located at a location different from a location where the active-cloud orchestrator node is located. The instructions, when executed by the at least one processor individually or collectively, may cause the active-NSMF to determine at least one action to be performed based on the GR information. The instructions, when executed by the at least one processor individually or collectively, may cause the active-NSMF to perform the at least one action for life cycle management (LCM) operation.

In an embodiment, the GR information may further comprise a current state of an active Element Management System (EMS) associated with the active-NSMF and a standby EMS associated with the standby-NSMF.

In an embodiment, the GR information of the GR information of the standby-cloud orchestrator node may be stored in the GR controller of the standby-cloud orchestrator node by sending, from the GR controller of the active-cloud orchestrator node to the GR controller of the standby-cloud orchestrator node, a data synchronization request message and by receiving, by the GR controller of the active-cloud orchestrator node, a data synchronization response message comprising the GR information from the GR controller of the standby-cloud orchestrator node In an embodiment, the instructions, when executed by the at least one processor individually or collectively, may cause the active-NSMF for the performing, by the active-NSMF of the active-cloud orchestrator node, of the at least one action to perform the LCM operation for at least one of monitoring at least one of a network slice instance (NSI) event and a network slice subnet instance (NSSI) event, subscribing for events and processing notification from at least one of an EMS, an NSI, an NSSI and network functions (NFs), and monitoring at least one of an NSI, an NSSI fault management (FM), and a performance management (PM) in case that the synchronization status is normal and the current state of the active-NSMF is active, the synchronization status is abnormal and the current state of the active-NSMF is active, the synchronization status is unknown and the current state of the active-NSMF is active, or the synchronization status is unknown and the current state of the active-NSMF is standby.

In an embodiment, the instructions, when executed by the at least one processor individually or collectively, may cause the active-NSMF for the performing, by the active-NSMF of the active-cloud orchestrator node, of the at least one action to skip the LCM operation for at least one of monitoring at least one of a NSI event and a NSSI event, subscribing for events and notification from at least one of an EMS, an NSI, an NSSI and NFs, and monitoring at least one of a NSI, a NSSI FM, and a PM in case that the synchronization status is normal and the current state of the active-NSMF is standby, or the synchronization status is abnormal and the current state of the active-NSMF is standby.

According to embodiments, a non-transitory computer-readable storage medium, when individually or collectively executed by at least one processor of an active-network slice management function (NSMF) of an active-cloud orchestrator node for geo redundancy (GR) awareness, may store one or more programs including instructions that cause the active-NSMF to send, to a GR controller of the active-cloud orchestrator node, a GR information request message to receive GR information. The non-transitory computer-readable storage medium, when individually or collectively executed by the at least one processor, may store one or more programs including instructions that cause the active-NSMF to receive, from the GR controller of the active-cloud orchestrator node, a GR information response message comprising the GR information including a synchronization status between the active-NSMF and a standby-NSMF of a standby-cloud orchestrator node and a current state of each of the active-NSMF and the standby-NSMF. The standby-cloud orchestrator node may be located at a location different from a location where the active-cloud orchestrator node is located. The non-transitory computer-readable storage medium, when individually or collectively executed by the at least one processor, may store one or more programs including instructions that cause the active-NSMF to determine at least one action to be performed based on the GR information. The non-transitory computer-readable storage medium, when individually or collectively executed by the at least one processor, may store one or more programs including instructions that cause the active-NSMF to perform the at least one action for life cycle management (LCM) operation.

In an embodiment, the GR information may further comprise a current state of an active Element Management System (EMS) associated with the active-NSMF and a standby EMS associated with the standby-NSMF.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as described defined by the appended claims and their equivalents.

No claim element is to be construed under the provisions of 35 U.S.C. § 112, sixth paragraph, unless the element is expressly recited using the phrase "means for" or "means".

What is claimed is:

1. A method performed by an active-network slice management function (NSMF) of an active-cloud orchestrator node for geo redundancy (GR) awareness, the method comprising:

sending, to a GR controller of the active-cloud orchestrator node, a GR information request message to receive GR information;

receiving, from the GR controller of the active-cloud orchestrator node, a GR information response message comprising the GR information including a synchronization status between the active-NSMF and a standby-NSMF of a standby-cloud orchestrator node and a current state of each of the active-NSMF and the standby-NSMF, wherein the standby-cloud orchestrator node is located at a location different from a location where the active-cloud orchestrator node is located;

determining at least one action to be performed based on the GR information; and performing the at least one action for life cycle management (LCM) operation.

2. The method of claim 1, wherein the GR information further comprises a current state of an active Element Management System (EMS) associated with the active-NSMF and a standby EMS associated with the standby-NSMF.

3. The method of claim 1, wherein the GR information of the GR information of the standby-cloud orchestrator node is stored in the GR controller of the standby-cloud orchestrator node by sending, from the GR controller of the active-cloud orchestrator node to the GR controller of the standby-cloud orchestrator node, a data synchronization request message and by receiving, by the GR controller of the active-cloud orchestrator node, a data synchronization response message comprising the GR information from the GR controller of the standby-cloud orchestrator node.

4. The method of claim 1, wherein the performing, by the active-NSMF of the active-cloud orchestrator node, of the at least one action comprises:

performing the LCM operation for at least one of monitoring at least one of a network slice instance (NSI) event and a network slice subnet instance (NSSI) event, subscribing for events and processing notification from at least one of an EMS, an NSI, an NSSI and network functions (NFs), and monitoring at least one of an NSI, an NSSI fault management (FM), and a performance management (PM) in response to determining that the synchronization status is normal and the current state of the active-NSMF is active, the synchronization status is abnormal and the current state of the active-NSMF is active, the synchronization status is unknown and the current state of the active-NSMF is active, or the synchronization status is unknown and the current state of the active-NSMF is standby.

5. The method of claim 1, wherein the performing, by the active-NSMF of the active-cloud orchestrator node, of the at least one action comprises:

skipping the LCM operation for at least one of monitoring at least one of a NSI event and a NSSI event, subscribing for events and notification from at least one of an EMS, an NSI, an NSSI and NFs, and monitoring at least one of a NSI, a NSSI FM, and a PM in response to determining that the synchronization status is normal and the current state of the active-NSMF is standby, or the synchronization status is abnormal and the current state of the active-NSMF is standby.

6. The method of claim 1, further comprising:

sending, to an active EMS, a registration request message to register the active-NSMF with the active EMS; and receiving, from the active EMS, a registration response message confirming registration of the active-NSMF with the active EMS.

7. The method of claim 1, further comprising:

sending, to a standby EMS, a registration request message to register the active-NSMF with the standby EMS; and receiving, from the standby EMS, a registration response message confirming registration of the active-NSMF with the standby EMS.

8. The method of claim 1, further comprising:

sending, to an active EMS, a subscription or publication notification request message to receive notification corresponding to specific events associated with the standby-cloud orchestrator node; and receiving, from the active EMS, a subscription or publication notification response message confirming subscription for the notification corresponding to specific events associated with the standby-cloud orchestrator node.

9. The method of claim 1, further comprising:

sending, to a standby EMS, a subscription or publication notification request message to receive notification corresponding to specific events associated with the standby-cloud orchestrator node; and receiving, from the standby EMS, a subscription or publication notification response message confirming subscription for the notification corresponding to specific events associated with the standby-cloud orchestrator node.

10. The method of claim 1, wherein the standby-NSMF of the standby-cloud orchestrator node is switched to a new active-NSMF in response to determining that the active NSMF of the active-cloud orchestrator node is down.

11. The method of claim 1, wherein the method comprises:

correlating data from all south bound (SB) subsystem to create a digested metric data;

determining ideal resources at the standby-NSMF required to perform the LCM operation of the at least one state of the plurality of states of the LCM operation based on the digested metric data; and transmitting a set of data from the digested metric data to the standby-NSMF to perform the LCM operations based on the ideal resources at the standby-NSMF.

12. The method of claim 1, wherein the method comprises:

correlating data from all south bound (SB) subsystem to create a digested metric data; and synchronizing by transmitting a set of data from the digested metric data to the standby-NSMF based on at least one parameter associated with the standby-NSMF.

13. The method of claim 1, wherein each of the active-NSMF and the standby-NSMF includes a north bound interface (NBI) and a south bound interface (SBI) configured to manage traffic between the NSMF and a network slice instance (NSI), network slice subnet instance (NSSI), and network functions (NF).

14. An active-network slice management function (NSMF) of an active-cloud orchestrator node for geo redundancy (GR) awareness, comprising:

memory storing instructions, and at least one processor, wherein the instructions, when executed by the at least one processor individually or collectively, cause the active-NSMF to:

send, to a GR controller of the active-cloud orchestrator node, a GR information request message to receive GR information;

receive, from the GR controller of the active-cloud orchestrator node, a GR information response message comprising the GR information including a synchronization status between the active-NSMF and a standby-NSMF of a standby-cloud orchestrator node and a current state of each of the active-NSMF and the standby-NSMF, wherein the standby-cloud orchestrator node is located at a location different from a location where the active-cloud orchestrator node is located;

determine at least one action to be performed based on the GR information; and perform the at least one action for life cycle management (LCM) operation.

15. The active-NSMF of claim 14, wherein the GR information further comprises a current state of an active Element Management System (EMS) associated with the active-NSMF and a standby EMS associated with the standby-NSMF.

16. The active-NSMF of claim 14, wherein the GR information of the GR information of the standby-cloud orchestrator node is stored in the GR controller of the standby-cloud orchestrator node by sending, from the GR controller of the active-cloud orchestrator node to the GR controller of the standby-cloud orchestrator node, a data synchronization request message and by receiving, by the GR controller of the active-cloud orchestrator node, a data synchronization response message comprising the GR information from the GR controller of the standby-cloud orchestrator node.

17. The active-NSMF of claim 14, wherein the instructions, when executed by the at least one processor individually or collectively, cause the active-NSMF for the performing, by the active-NSMF of the active-cloud orchestrator node, of the at least one action to:

perform the LCM operation for at least one of monitoring at least one of a network slice instance (NSI) event and a network slice subnet instance (NSSI) event, subscribing for events and processing notification from at least one of an EMS, an NSI, an NSSI and network functions (NFs), and monitoring at least one of an NSI, an NSSI fault management (FM), and a performance management (PM) in response to determining that the synchronization status is normal and the current state of the active-NSMF is active, the synchronization status is abnormal and the current state of the active-NSMF is active, the synchronization status is unknown and the current state of the active-NSMF is active, or the synchronization status is unknown and the current state of the active-NSMF is standby.

18. The active-NSMF of claim 14, wherein the instructions, when executed by the at least one processor individually or collectively, cause the active-NSMF for the performing, by the active-NSMF of the active-cloud orchestrator node, of the at least one action to:

skip the LCM operation for at least one of monitoring at least one of a NSI event and a NSSI event, subscribing for events and notification from at least one of an EMS, an NSI, an NSSI and NFs, and monitoring at least one of a NSI, a NSSI FM, and a PM in response to determining that the synchronization status is normal and the current state of the active-NSMF is standby, or the synchronization status is abnormal and the current state of the active-NSMF is standby.

19. A non-transitory computer-readable storage medium, when individually or collectively executed by at least one processor of an active-network slice management function (NSMF) of an active-cloud orchestrator node for geo redundancy (GR) awareness, stores one or more programs including instructions that cause the active-NSMF to:

send, to a GR controller of the active-cloud orchestrator node, a GR information request message to receive GR information;

receive, from the GR controller of the active-cloud orchestrator node, a GR information response message comprising the GR information including a synchronization status between the active-NSMF and a standby-NSMF of a standby-cloud orchestrator node and a current state of each of the active-NSMF and the standby-NSMF, wherein the standby-cloud orchestrator node is located at a location different from a location where the active-cloud orchestrator node is located;

determine at least one action to be performed based on the GR information; and perform the at least one action for life cycle management (LCM) operation.

20. The non-transitory computer-readable storage medium of claim 19, wherein the GR information further comprises a current state of an active Element Management System (EMS) associated with the active-NSMF and a standby EMS associated with the standby-NSMF.

* * * * *